(12) United States Patent
Choi

(10) Patent No.: US 11,512,515 B2
(45) Date of Patent: Nov. 29, 2022

(54) HOLD LOCK MECHANISM FOR VEHICLE DOOR AND VEHICLE DOOR OPENING AND CLOSING APPARATUS HAVING THE SAME

(71) Applicants: Hyundai Motor Company, Seoul (KR); Kia Motors Corporation, Seoul (KR)

(72) Inventor: Je Won Choi, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 17/002,159

(22) Filed: Aug. 25, 2020

(65) Prior Publication Data

US 2021/0172228 A1 Jun. 10, 2021

(30) Foreign Application Priority Data

Dec. 5, 2019 (KR) .................... 10-2019-0160946

(51) Int. Cl.
*E05B 65/00* (2006.01)
*E05D 15/48* (2006.01)
(Continued)

(52) U.S. Cl.
CPC ............ *E05D 15/48* (2013.01); *B60J 5/0468* (2013.01); *B60J 5/0473* (2013.01); *B60J 5/06* (2013.01); *E05D 15/08* (2013.01); *E05D 15/1047* (2013.01); *E05D 2015/1055* (2013.01); *E05D 2015/485* (2013.01); *E05Y 2201/64* (2013.01); *E05Y 2201/684* (2013.01); *E05Y 2201/688* (2013.01); *E05Y 2600/45* (2013.01); *E05Y 2600/46* (2013.01); *E05Y 2900/531* (2013.01)

(58) Field of Classification Search
CPC ............. B60J 5/06; E05D 2015/1047; E05D 2015/485; E05D 2201/64; E05D 2201/684; E05D 2201/688; E05D 13/04; E05Y 2600/45; E05Y 2600/46; E05B 63/12; E05B 63/121; E05B 63/122; E05B 63/123; E05B 63/124; E05B 63/125; E05B 63/126; E05B 63/127; E05B 63/128; E05B 17/2088
USPC ............................................. 70/93, 94, 208
See application file for complete search history.

(56) References Cited

U.S. PATENT DOCUMENTS 4,087,121 A * 5/1978 Davis .................... E05B 63/128
292/341.17
4,897,961 A * 2/1990 Shine .................. E05B 65/1033
49/357

(Continued)

FOREIGN PATENT DOCUMENTS

DE 102005045923 A1 * 5/2006 ........... B60R 21/213
EP 1529965 A2 * 5/2005 ............. B60N 2/015

(Continued)

*Primary Examiner* — Jerry E Redman
(74) *Attorney, Agent, or Firm* — Slater Matsil, LLP

(57) ABSTRACT

A hold lock mechanism for a vehicle door, the hold lock mechanism including a grip assembly configured to be mounted on a vehicle body, the grip assembly including a pair of grip members configured to releasably grip a door component and a hook provided on at least one of grip members, and a release assembly mounted on the door component, the release assembly including a release member configured to releasably engage with the hook.

19 Claims, 30 Drawing Sheets

(51) Int. Cl.
      *E05D 15/08*     (2006.01)
      *E05D 15/10*     (2006.01)
      *B60J 5/06*       (2006.01)
      *B60J 5/04*       (2006.01)

(56) References Cited

U.S. PATENT DOCUMENTS

| | | | |
|---|---|---|---|
| 2014/0306467 A1* | 10/2014 | Wollacott | E05C 17/46 |
| | | | 292/341.15 |
| 2021/0140215 A1 | 5/2021 | Choi | |

FOREIGN PATENT DOCUMENTS

| | | | | |
|---|---|---|---|---|
| EP | 1757758 A2 * | 2/2007 | | E05B 17/0058 |
| FR | 2820449 A1 * | 8/2002 | | B60N 2/01533 |
| GB | 2449866 A * | 12/2008 | | E05B 65/0021 |
| GB | 2478923 A * | 9/2011 | | B60D 1/60 |
| KR | 20210057616 A | 5/2021 | | |
| WO | WO-2010091019 A1 * | 8/2010 | | E05B 63/128 |

\* cited by examiner

HOLD LOCK MECHANISM FOR VEHICLE DOOR AND VEHICLE DOOR OPENING AND CLOSING APPARATUS HAVING THE SAME

CROSS-REFERENCE TO RELATED APPLICATIONS

This application claims the benefit of Korean Patent Application No. 10-2019-0160946, filed in the Korean Intellectual Property Office on Dec. 5, 2019, which application is hereby incorporated herein by reference.

TECHNICAL FIELD

The present disclosure relates to a hold lock mechanism for a vehicle door and a vehicle door opening and closing apparatus having the same.

BACKGROUND

As is well known, vehicles have a variety of door apertures/openings for ingress and egress of vehicle passengers, loading and unloading of luggage, replacement and repair of components, and the like. A vehicle door is closed to block the door aperture and is opened to enable ingress and egress of passengers.

There are various vehicle doors such as side doors, a tailgate, a liftgate, and a hood. A striker may be mounted on a vehicle body, and a hold lock mechanism (or door latch mechanism) having a catch (or latch) may be mounted on the vehicle door. The striker may releasably engage with the hold lock mechanism so that the vehicle door may be releasably held or locked in a predetermined position (open position or closed position).

In a conventional hold lock mechanism, when the striker engages with the catch (or latch) of the hold lock mechanism, a contact area between the striker and the catch is relatively narrow. In addition, a slight gap may be created between the striker and the catch. Accordingly, the striker and the catch may slightly move in a state in which the striker engages with the catch. That is, when the vehicle door is held in a predetermined position by the hold lock mechanism, slight movements between the striker and the catch may lead to the shaking or vibration of the vehicle door.

The above information described in this background section is provided to assist in understanding the background of the inventive concept, and may include any technical concept which is not considered as the prior art that is already known to those skilled in the art.

SUMMARY

Embodiments of the present disclosure solve problems occurring in the prior art while advantages achieved by the prior art are maintained intact.

The present disclosure relates to a hold lock mechanism for a vehicle door and a vehicle door opening and closing apparatus having the same. Particular embodiments relate to a hold lock mechanism for a vehicle door and a vehicle door opening and closing apparatus having the same capable of preventing shaking or vibration of the vehicle door when holding the vehicle door in a predetermined position.

An aspect of the present disclosure provides a hold lock mechanism for a vehicle door and a vehicle door opening and closing apparatus having the same capable of preventing shaking or vibration of the vehicle door when holding the vehicle door in a predetermined position.

According to an aspect of the present disclosure, a hold lock mechanism for a vehicle door, which releasably holds a door component mounted on a vehicle door in a predetermined position of a vehicle, may include a grip assembly mounted on a vehicle body, and including a pair of grip members releasably gripping the door component and a hook provided on at least one of the pair of grip members, and a release assembly mounted on the door component, and including a release member releasably engaging with the hook.

At least one grip member of the pair of grip members may move between a grip position in which the grip member grips the door component and a release position in which the grip member releases the door component.

The door component may have a cavity, and the release member may be movably received in the cavity. The hook may move between an advanced position in which the hook is received in the cavity of the door component and a retracted position in which the hook is released from the door component, and the hook may be biased toward the advanced position by a first biasing member.

The hook may have a first engaging surface extending vertically and a second engaging surface extending obliquely, the cavity may have a third engaging surface slidably contacting the first engaging surface, the release member may have a fourth engaging surface facing the third engaging surface, and the fourth engaging surface may slidably contact the second engaging surface.

The release member may move between an engaging position in which the release member engages with the hook moved to the advanced position and a release position in which the release member moves the hook to the retracted position, and the release member may be biased toward the engaging position by a second biasing member.

A movement direction of the release member may be orthogonal to a movement direction of the hook.

An axis of the second biasing member may be orthogonal to an axis of the first biasing member.

The release member may be moved to the release position by a release lever.

The release lever may be pivotally mounted to the door component, and the release lever may be pivoted by a control cable assembly.

The release lever may move between a lock position in which the release lever holds the release member in the engaging position and an unlock position in which the release lever moves the release member to the release position.

According to another aspect of the present disclosure, a vehicle door opening and closing apparatus may include a vehicle door, a rail mounted on a vehicle body, a roller unit mounted on the vehicle door, and moving along the rail, and a hold lock mechanism releasably holding the roller unit in a predetermined position of a vehicle, wherein the hold lock mechanism may include a grip assembly mounted on the vehicle body, and including a pair of grip members releasably gripping the roller unit and a hook movably mounted on at least one of the pair of grip members, and a release assembly mounted on the roller unit, and including a release member releasably engaging with the hook.

The roller unit may allow the vehicle door to open and close in one mode selected from a sliding mode, in which the vehicle door slides along the rail, and a swing mode, in which the vehicle door swings in a predetermined position of the rail.

The vehicle door may swing when the roller unit is held in a predetermined position of the rail by the hold lock mechanism, and the vehicle door may slide along the rail when the roller unit is released by the hold lock mechanism.

The roller unit may include a roller bracket having a roller rolling along the rail, and a body connecting the roller bracket and the vehicle door, and the body may have a first end portion fixed to the roller bracket, and a second end portion pivotally connected to the vehicle door.

The release assembly may be mounted on the body.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
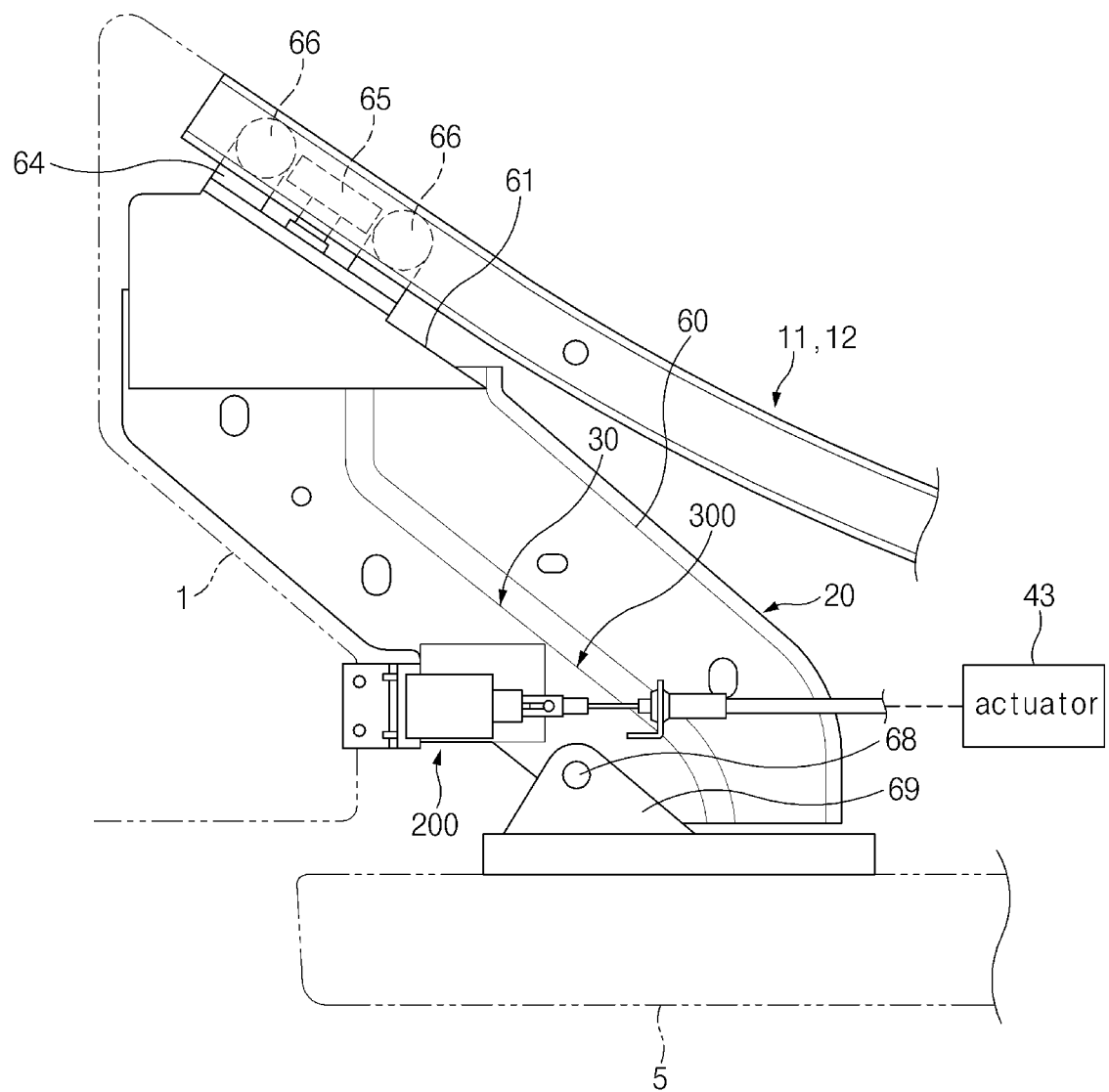
FIG. 1 illustrates a plan view of a hold lock mechanism for a vehicle door according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A hold lock mechanism 30 for a vehicle door according to exemplary embodiments of the present disclosure may releasably hold a door component 20 mounted on a vehicle door 5 in a predetermined position of a vehicle body 1. For example, the door component 20 may be a link mechanism, a roller unit (a roller carriage), and/or a striker mounted on the vehicle door 5.

Figure 2:
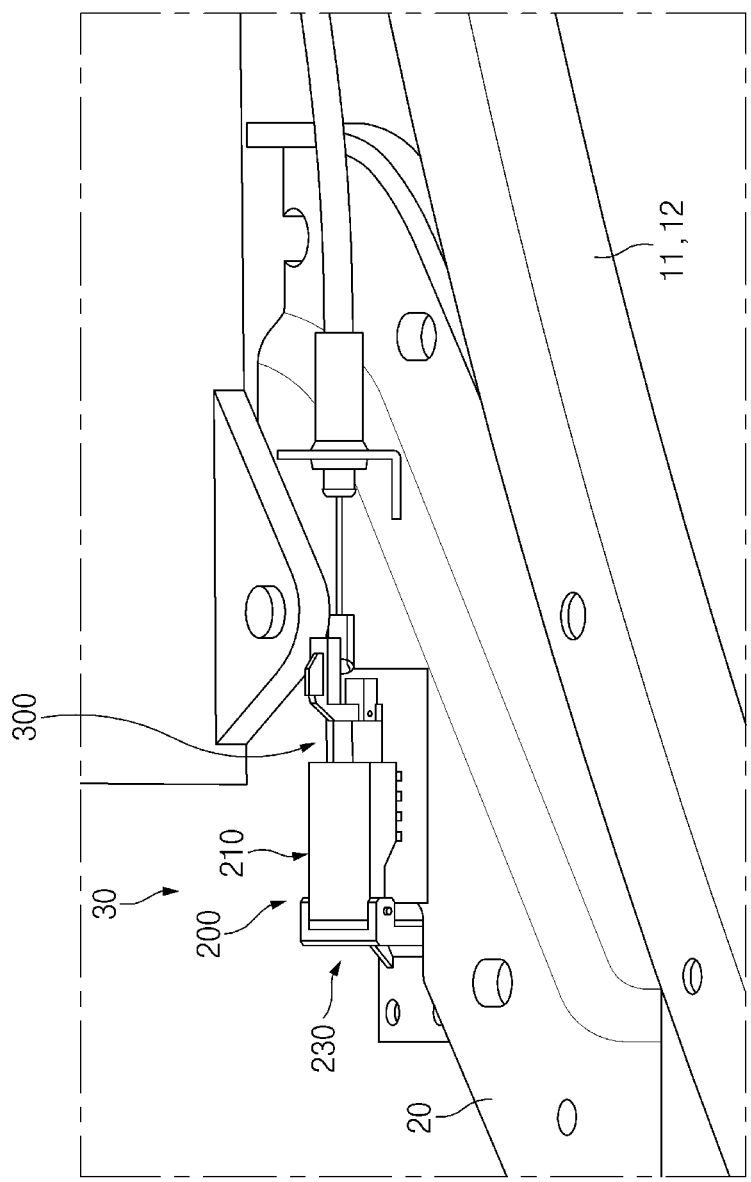
FIG. 2 illustrates a perspective view of a hold lock mechanism for a vehicle door according to an exemplary embodiment of the present disclosure.

Referring to FIGS. 1 and 2, the hold lock mechanism 30 for a vehicle door according to exemplary embodiments of the present disclosure may include a grip assembly 200 mounted on the vehicle body 1, and a release assembly 300 mounted on the door component 20.

The door component 20 illustrated in FIGS. 1 and 2 may be a roller unit mounted on the vehicle door 5 such as a sliding door and a swing door. For example, the door component 20 may include an upper roller unit 21 and a lower roller unit 22 (see FIGS. 19 and 20), and the roller units 21 and 22 may be guided along upper and lower rails 11 and 12 of the vehicle body 1.

The grip assembly 200 may include an upper grip member 210, a lower grip member 220 facing the upper grip member 210, and a mounting bracket 230 to which the upper grip member 210 and the lower grip member 220 are mounted. The mounting bracket 230 may be fixed to the vehicle body 1, and at least one grip member of the upper grip member 210 and the lower grip member 220 may be pivotally mounted to the mounting bracket 230.

Figure 3:
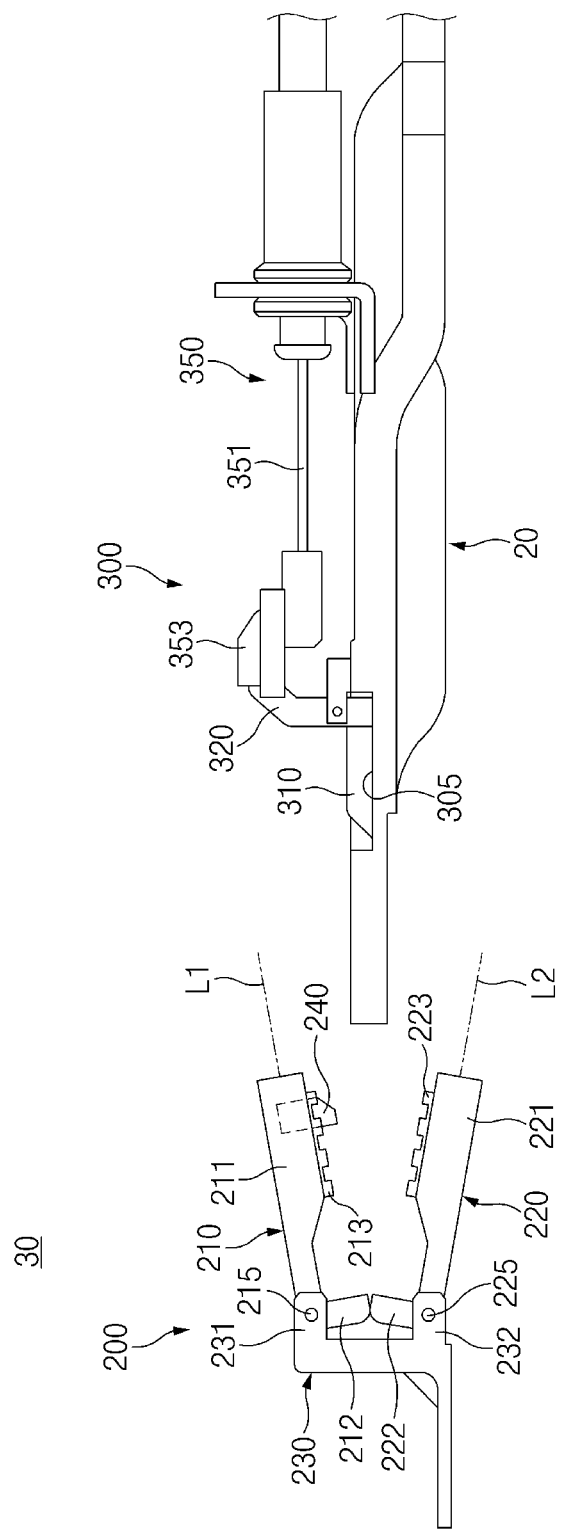
FIG. 3 illustrates a state in which a door component is released from a grip assembly in a hold lock mechanism for a vehicle door according to an exemplary embodiment of the present disclosure.
Figure 4:
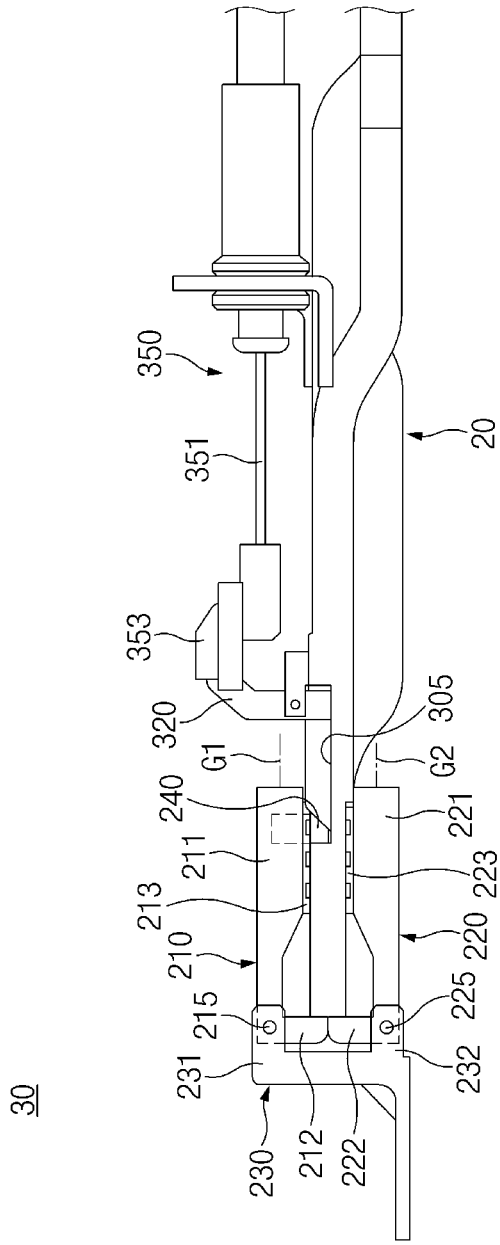
FIG. 4 illustrates a state in which a door component is engaged with a grip assembly in a hold lock mechanism for a vehicle door according to an exemplary embodiment of the present disclosure.

Referring to FIGS. 3 and 4, the upper grip member 210 and the lower grip member 220 may be symmetrically disposed with respect to the door component 20. The upper grip member 210 and the lower grip member 220 may be pivotally mounted to the mounting bracket 230. The mounting bracket 230 may include an upper pivot lug 231 to which the upper grip member 210 is pivotally mounted through an upper hinge pin 215, and a lower pivot lug 232 to which the lower grip member 220 is pivotally mounted through a lower hinge pin 225. The upper pivot lug 231 may extend horizontally from a top end of the mounting bracket 230, and the lower pivot lug 232 may extend horizontally from a bottom end of the mounting bracket 230.

Figure 5:
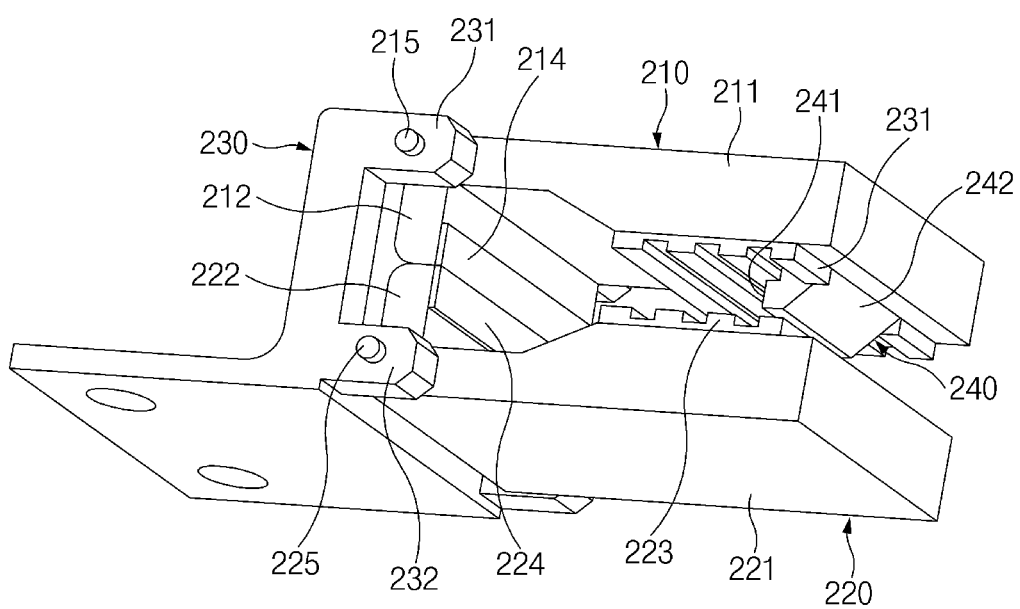
FIG. 5 illustrates a perspective view of a grip assembly in a hold lock mechanism for a vehicle door according to an exemplary embodiment of the present disclosure.
Figure 6:
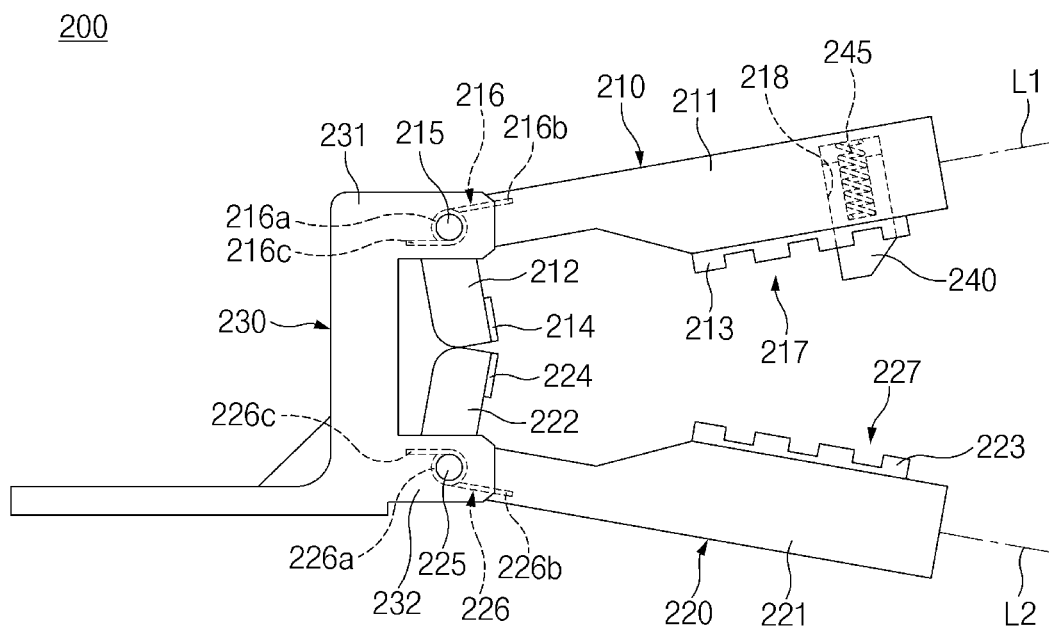
FIG. 6 illustrates a side view of a grip assembly in a hold lock mechanism for a vehicle door according to an exemplary embodiment of the present disclosure, in a state in which an upper grip portion of an upper grip member moves to a release position, and a lower grip portion of a lower grip member moves to a release position.
Figure 7:
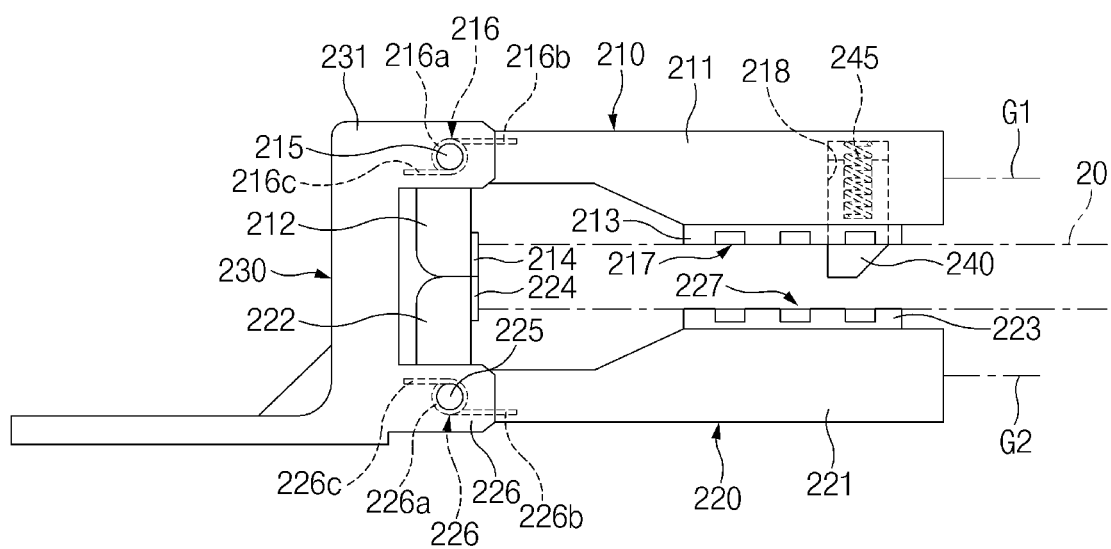
FIG. 7 illustrates a side view of a grip assembly in a hold lock mechanism for a vehicle door according to an exemplary embodiment of the present disclosure, in a state in which an upper grip portion of an upper grip member moves to a grip position, and a lower grip portion of a lower grip member moves to a grip position.

Referring to FIGS. 5 to 7, the upper grip member 210 may be pivotally mounted to the upper pivot lug 231 of the mounting bracket 230 through the upper hinge pin 215. The upper grip member 210 may include an upper grip portion 211 extending toward the door component 20, and an upper arm 212 extending downwardly from the upper grip portion 211.

The upper grip portion 211 may grip a top surface of the door component 20. The upper grip portion 211 may include an upper grip pad 213 attached to a bottom surface thereof, and the upper grip pad 213 may be made of a friction material such as rubber. The upper grip pad 213 may directly contact the top surface of the door component 20. The upper grip pad 213 may have a grip pattern 217 such as a tooth pattern, whereby a grip force of the upper grip portion 211 may be increased.

The upper arm 212 may have an upper touch portion 214 which is capable of touching a side surface of the door component 20, and the upper touch portion 214 may have a shape corresponding to the side surface of the door component 20. For example, the upper arm 212 may extend orthogonally with respect to the upper grip portion 211.

The upper grip member 210 may move between a first grip position G1 and a first release position L1. In the first grip position G1, when the side surface of the door component 20 touches the upper touch portion 214 of the upper arm 212, the upper grip member 210 may pivot toward the top surface of the door component 20 so that the upper grip portion 211 of the upper grip member 210 may grip the top surface of the door component 20. In the first release position L1, when the side surface of the door component 20 is spaced apart from the upper touch portion 214 of the upper arm 212, the upper grip portion 211 may move away from the top surface of the door component 20 so that the upper grip portion 211 may release the top surface of the door component 20.

The upper hinge pin 215 may be positioned between the upper grip portion 211 and the upper arm 212, and the upper grip member 210 may be biased toward the first release position L1 by an upper biasing member 216 disposed around the upper hinge pin 215. The upper biasing member 216 may include a spring portion 216a disposed around the upper hinge pin 215, a first leg 216b fixed to the upper grip member 210, and a second leg 216c fixed to the mounting bracket 230.

Referring to FIGS. 5 to 7, the lower grip member 220 may be pivotally mounted to the lower pivot lug 232 of the mounting bracket 230 through the lower hinge pin 225. The lower grip member 220 may include a lower grip portion 221 extending toward the door component 20, and a lower arm 222 extending upwardly from the lower grip portion 221.

The lower grip portion 221 may grip a bottom surface of the door component 20. The lower grip portion 221 may include a lower grip pad 223 attached to a bottom surface thereof, and the lower grip pad 223 may be made of a friction material such as rubber. The lower grip pad 223 may directly contact the bottom surface of the door component 20. The lower grip pad 223 may have a grip pattern 227 such as a tooth pattern, whereby a grip force of the lower grip portion 221 may be increased.

The lower arm 222 may have a lower touch portion 224 which is capable of touching the side surface of the door component 20, and the lower touch portion 224 may have a shape corresponding to the side surface of the door component 20. For example, the lower arm 222 may extend orthogonally with respect to the lower grip portion 221.

The lower grip member 220 may move between a second grip position G2 and a second release position L2. In the second grip position G2, when the side surface of the door component 20 touches the lower touch portion 224 of the lower arm 222, the lower grip member 220 may pivot toward the bottom surface of the door component 20 so that the lower grip portion 221 of the lower grip member 220 may grip the bottom surface of the door component 20. In the second release position L2, when the side surface of the door component 20 is spaced apart from the lower touch portion 224 of the lower arm 222, the lower grip portion 221 may move away from the bottom surface of the door component 20 so that the lower grip portion 221 may release the bottom surface of the door component 20.

The lower hinge pin 225 may be positioned between the lower grip portion 221 and the lower arm 222, and the lower grip member 220 may be biased toward the second release position L2 by a lower biasing member 226 disposed around the lower hinge pin 225. The lower biasing member 226 may include a spring portion 226a disposed around the lower hinge pin 225, a first leg 226b fixed to the lower grip member 220, and a second leg 226c fixed to the mounting bracket 230.

The grip assembly 200 may include a hook 240 mounted on at least one grip member of the upper grip member 210 and the lower grip member 220. The door component 20 may have a cavity 305, and at least a portion of the hook 240 may be received in the cavity 305 so that the hook 240 may be engaged by the release assembly 300.

According to exemplary embodiments, the hook 240 may be provided on the upper grip member 210 as illustrated in FIGS. 3 to 7.

The hook 240 may be movably mounted in a recess 218 of the upper grip portion 211. An axis of the hook 240 may be orthogonal to an axis of the upper grip member 210, and thus the hook 240 may be movable in a direction orthogonal to the axis of the upper grip member 210. The hook 240 may be movable between an advanced position (see FIG. 10) and a retracted position (see FIG. 11).

Figure 10:
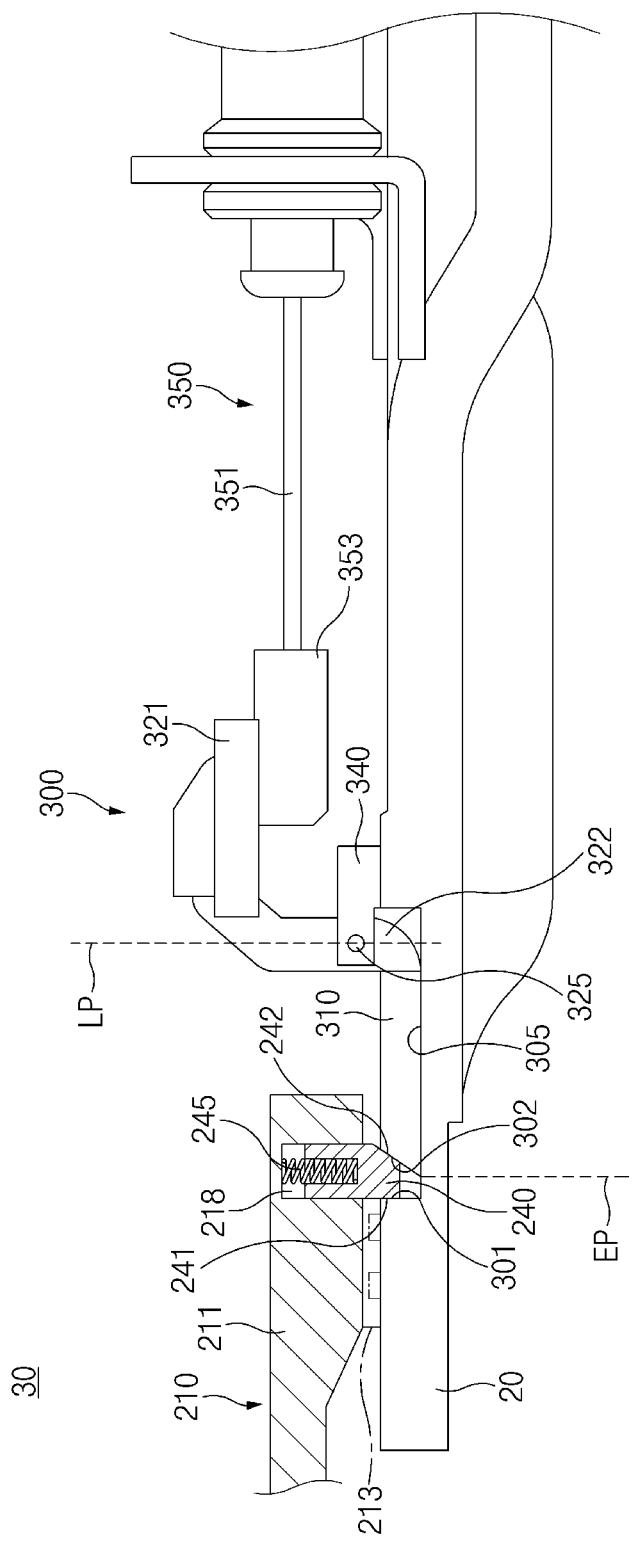
FIG. 10 illustrates a state in which a release assembly engages with a hook of a grip assembly in a hold lock mechanism for a vehicle door according to an exemplary embodiment of the present disclosure.
Figure 11:
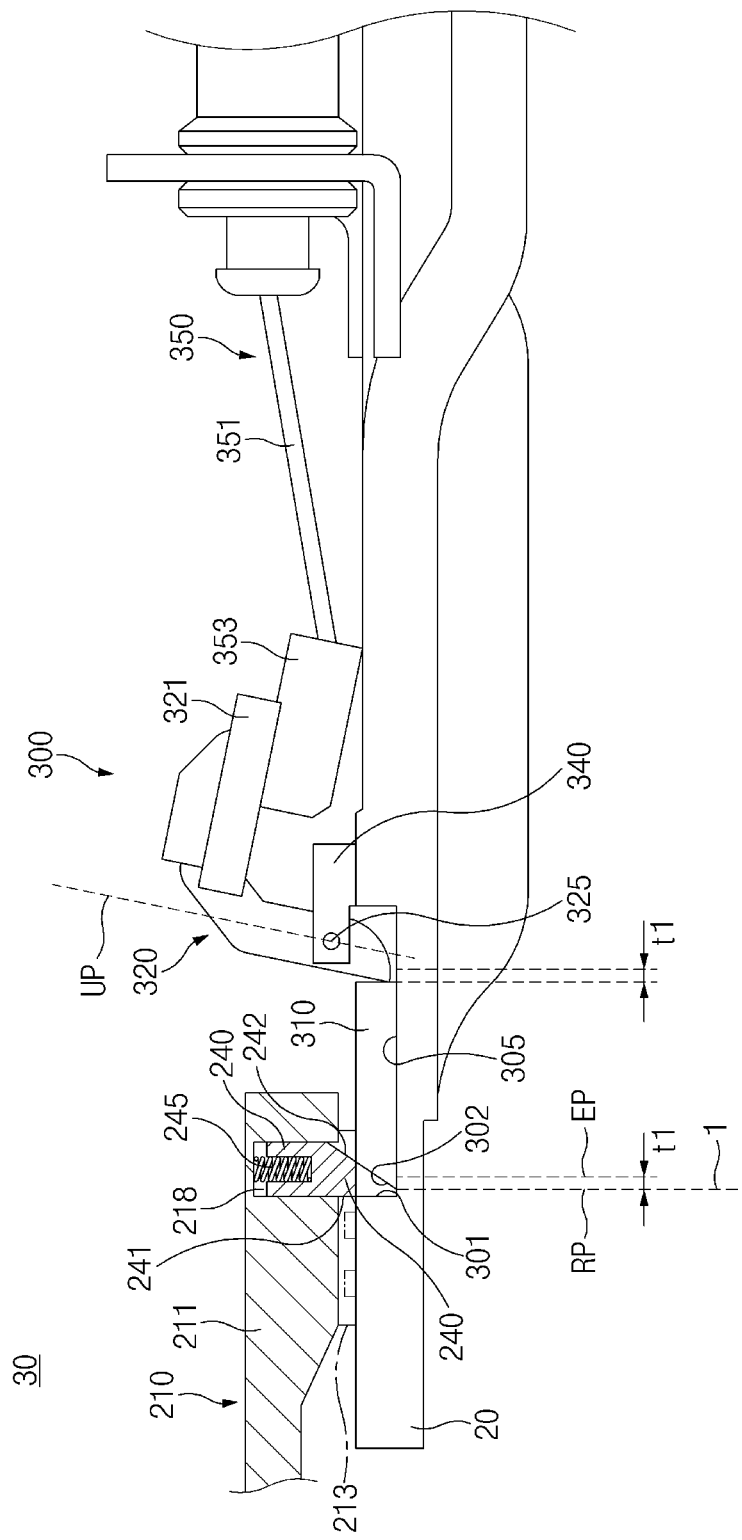
FIG. 11 illustrates a state in which a release assembly releases a hook of a grip assembly in a hold lock mechanism for a vehicle door according to an exemplary embodiment of the present disclosure.

Referring to FIG. 10, when the hook 240 is in the advanced position, the hook 240 may be received in the cavity 305 of the door component 20 so that it may be engaged with the door component 20 by a release member 310 to be described below. Referring to FIG. 11, when the hook 240 is in the retracted position, the hook 240 may disengage from the cavity 305 of the door component 20 so that it may be released from the door component 20 by the release member 310 to be described below.

The hook 240 may be biased toward the advanced position by a first biasing member 245. The first biasing member 245 may be a coil spring pushing the hook 240 within the recess 218. An axis of the first biasing member 245 may be parallel to the axis of the hook 240. When a biasing force (spring force) of the first biasing member 245 is greater than an external force, the first biasing member 245 may be extended, and thus the hook 240 may move to the advanced position. When the biasing force (spring force) of the first biasing member 245 is less than the external force, the first biasing member 245 may be compressed, and thus the hook 240 may move to the retracted position. That is, when the hook 240 is in the advanced position rather than in the retracted position, the hook 240 may protrude further from the upper grip member 210.

The hook 240 may have a first engaging surface 241 extending vertically and a second engaging surface 242 extending obliquely. The first engaging surface 241 and the second engaging surface 242 may be provided on a lower portion of the hook 240.

As the release assembly 300 releasably engages with the hook 240, the release assembly 300 may releasably lock the upper grip member 210 and the lower grip member 220 gripping the door component 20.

Referring to FIGS. 3, 4, 8, 9, 10, and 11, the release assembly 300 may include the release member 310 which is movably mounted in the cavity 305 of the door component 20.

Referring to FIGS. 8 to 11, the cavity 305 may receive the hook 240, and the top of the cavity 305 may be opened. The cavity 305 may have a third engaging surface 301, and the third engaging surface 301 may extend vertically to correspond to the first engaging surface 241. The release member 310 may have a fourth engaging surface 302 facing the third engaging surface 301, and the fourth engaging surface 302 may extend obliquely to correspond to the second engaging surface 242. The release member 310 may move between an engaging position EP (see FIG. 10) in which it engages with the hook 240 moved to the advanced position and a release position RP (see FIG. 11) in which it moves the hook 240 to the retracted position. An axis of the release member 310 may be orthogonal to the axis of the hook 240, and thus a movement direction of the release member 310 may be orthogonal to a movement direction of the hook 240.

Figure 8:
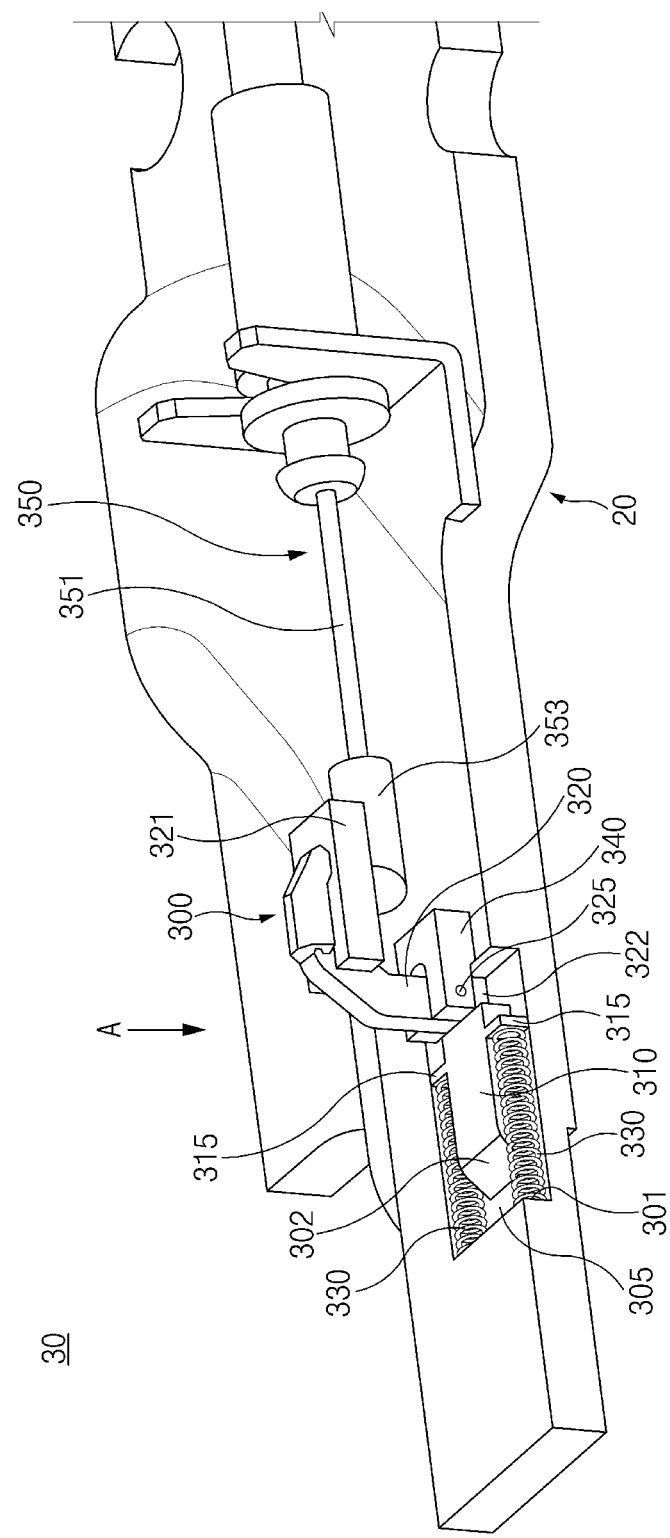
FIG. 8 illustrates a perspective view of a release assembly in a hold lock mechanism for a vehicle door according to an exemplary embodiment of the present disclosure.
Figure 9:
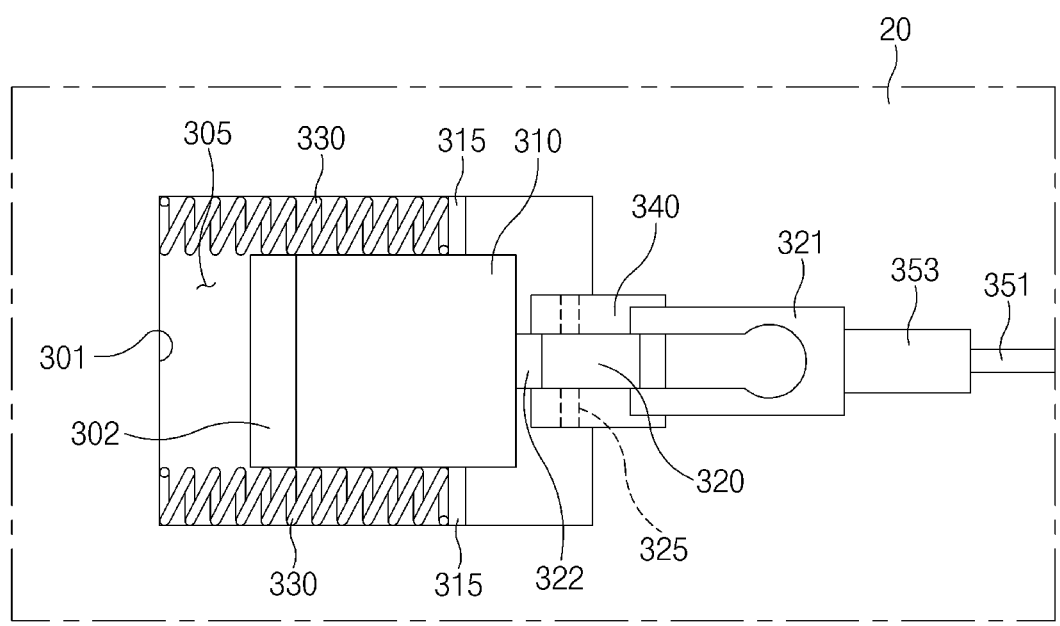
FIG. 9 illustrates a view, which is viewed from a direction indicated by arrow A of FIG. 8.

Referring to FIGS. 8 and 9, the release member 310 may be biased toward the engaging position EP by a second biasing member 330 such as a coil spring. The release member 310 may have a stopper 315 protruding from a side surface thereof, and the second biasing member 330 may be a coil spring interposed between the stopper 315 of the release member 310 and the third engaging surface 301. Referring to FIGS. 8 and 9, the pair of stoppers 315 may be symmetrically disposed on both side surfaces of the release member 310, and the pair of second biasing members 330 may be disposed on both sides of the release member 310.

Referring to FIG. 10, when the release member 310 is in the engaging position EP, the first engaging surface 241 and the second engaging surface 242 of the hook 240 may maintain contact with the third engaging surface 301 of the cavity 305 and the fourth engaging surface 302 of the release member 310 by the biasing force of the first biasing member 245 and the biasing force of the second biasing member 330.

Referring to FIG. 11, when the release member 310 moves toward the release position RP, the release member 310 may push the hook 240 toward the retracted position. Here, the first engaging surface 241 of the hook 240 may slide upwardly along the third engaging surface 301 of the cavity 305, and the second engaging surface 242 of the hook 240 may slide upwardly and obliquely along the fourth engaging surface 302 of the release member 310. That is, when the hook 240 moves to the retracted position, the hook 240 may compress the first biasing member 245 so that the hook 240 may be received in the recess 218 of the upper grip portion 211, and the hook 240 may disengage from the cavity 305 and the release member 310.

According to exemplary embodiments, an axis of the second biasing member 330 may be orthogonal to the axis of the first biasing member 245, and thus a direction in which the biasing force of the second biasing member 330 is applied may be orthogonal to a direction in which the biasing force of the first biasing member 245 is applied, and the movement direction of the release member 310 may be orthogonal to the movement direction of the hook 240. In particular, the hook 240 may press the release member 310 by the biasing force of the first biasing member 245, and thus the second engaging surface 242 of the hook 240 and the fourth engaging surface 302 of the release member 310 may be wedged with each other.

Referring to FIGS. 10 and 11, the release member 310 may be moved to the release position RP by a release lever 320, and the release lever 320 may be pivotally mounted to a pivot bracket 340 through a pivot pin 325. The pivot bracket 340 may be fixed to the door component 20.

Referring to FIGS. 10 and 11, the release lever 320 may be pivoted by a control cable assembly 350. The control cable assembly 350 may include a cable wire 351 which is movably disposed in a sheath. An end fitting 353 may be fixed to one end of the cable wire 351, and one end of the cable wire 351 may be connected to the release lever 320 through the end fitting 353, and the other end of the cable wire 351 may be connected to an actuator 43. The release lever 320 may have a first end portion 321 with which the end fitting 353 of the cable wire 351 engages, and a second end portion 322 with which the release member 310 contacts. Thus, the release lever 320 may pivot around the pivot pin 325 by the movement of the cable wire 351.

The release lever 320 may be moved between a lock position LP and an unlock position UP by the control cable assembly 350.

In the lock position LP, the release lever 320 may hold the release member 310 in the engaging position EP. Referring to FIG. 10, when the release lever 320 moves to the lock position, the second end portion 322 of the release lever 320 may support a rear end of the release member 310, and thus the release member 310 may be held in the engaging position EP, and the release member 310 may engage with the hook 240 moved to the advanced position. In the unlock position UP, the release lever 320 may move the release member 310 to the release position RP. Referring to FIG. 11, when the release lever 320 moves to the unlock position UP, the second end portion 322 of the release lever 320 may push the release member 310 by a predetermined distance ti, and thus the release member 310 may move to the release position RP, and the release member 310 may push the hook 240 toward the upper grip member 210 so that the hook 240 may disengage from the cavity 305 of the door component 20.

Figure 12:
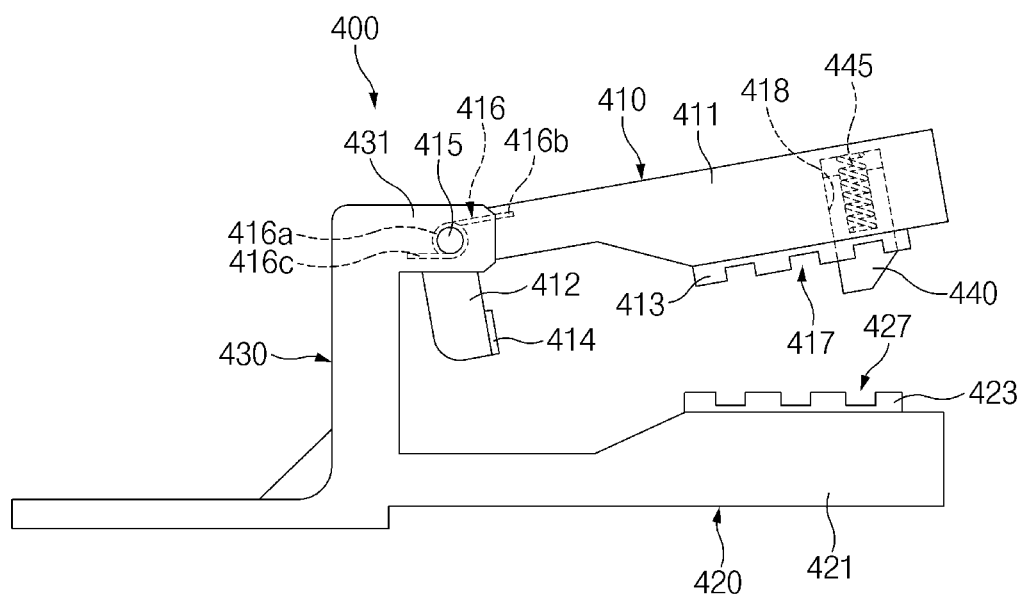
FIG. 12 illustrates an alternative example of a grip assembly in a hold lock mechanism for a vehicle door according to an exemplary embodiment of the present disclosure.

FIG. 12 illustrates a grip assembly 400 according to another exemplary embodiment of the present disclosure. Referring to FIG. 12, the grip assembly 400 may include an upper grip member 410, a lower grip member 420 facing the upper grip member 410, and a mounting bracket 430 to which the upper grip member 410 and the lower grip member 420 are mounted. The mounting bracket 430 may be fixed to the vehicle body 1. The upper grip member 410 may be pivotally mounted to the mounting bracket 430, and the lower grip member 420 may be fixed to the mounting bracket 430.

The upper grip member 410 and the lower grip member 420 may be symmetrically disposed with respect to the door component 20. The mounting bracket 430 may include an upper pivot lug 431 to which the upper grip member 410 is pivotally mounted through an upper hinge pin 415. The upper grip member 410 may be pivotally mounted to the upper pivot lug 431 of the mounting bracket 430 through the upper hinge pin 415. The upper grip member 410 may include an upper grip portion 411 extending toward the door component 20, and an upper arm 412 extending downwardly from the upper grip portion 411.

The upper grip portion 411 may grip the top surface of the door component 20. The upper grip portion 411 may include an upper grip pad 413 attached to a bottom surface thereof, and the upper grip pad 413 may be made of a friction material such as rubber. The upper grip pad 413 may directly contact the top surface of the door component 20. The upper grip pad 413 may have a grip pattern 417 such as a tooth pattern, whereby a grip force of the upper grip portion 411 may be increased.

The upper arm 412 may have an upper touch portion 414 which is capable of touching the side surface of the door component 20, and the upper touch portion 414 may have a shape corresponding to the side surface of the door component 20. For example, the upper arm 412 may extend orthogonally with respect to the upper grip portion 411.

The upper hinge pin 415 may be positioned between the upper grip portion 411 and the upper arm 412, and an upper biasing member 416 may be disposed around the upper hinge pin 415. The upper biasing member 416 may include a spring portion 416a disposed around the upper hinge pin 415, a first leg 416b fixed to the upper grip member 410, and a second leg 416c fixed to the mounting bracket 430.

The lower grip member 420 may include a lower grip portion 421 extending horizontally from a bottom end of the mounting bracket 430.

The lower grip portion 421 may grip the bottom surface of the door component 20. The lower grip portion 421 may include a lower grip pad 423 attached to a bottom surface thereof, and the lower grip pad 423 may be made of a friction material such as rubber. The lower grip pad 423 may directly contact the bottom surface of the door component 20. The lower grip pad 423 may have a grip pattern 427 such as a tooth pattern, whereby a grip force of the lower grip portion 421 may be increased.

The grip assembly 400 may include a hook 440 mounted on at least one grip member of the upper grip member 410 and the lower grip member 420. The hook 440 may be provided on the upper grip member 410. The hook 440 may be movably mounted in a recess 418 of the upper grip portion 411. An axis of the hook 440 may be orthogonal to an axis of the upper grip member 410, and thus a movement direction of the hook 440 may be orthogonal to the axis of the upper grip member 410. The hook 440 may be movable between an advanced position and a retracted position. The hook 440 may be biased toward the advanced position by a first biasing member 445. The first biasing member 445 may be a coil spring pushing the hook 440 within the recess 418. An axis of the first biasing member 445 may be parallel to the axis of the hook 440.

Figure 13:
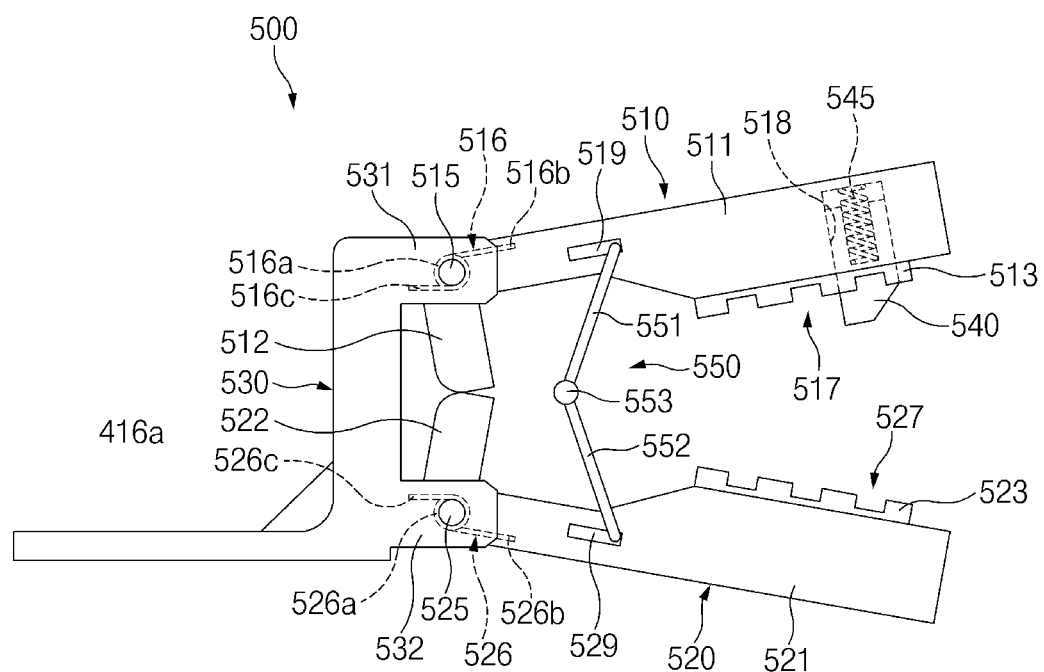
FIG. 13 illustrates another alternative example of a grip assembly in a hold lock mechanism for a vehicle door according to an exemplary embodiment of the present disclosure, in a state in which an upper grip portion of an upper grip member moves to a release position, and a lower grip portion of a lower grip member moves to a release position.
Figure 14:
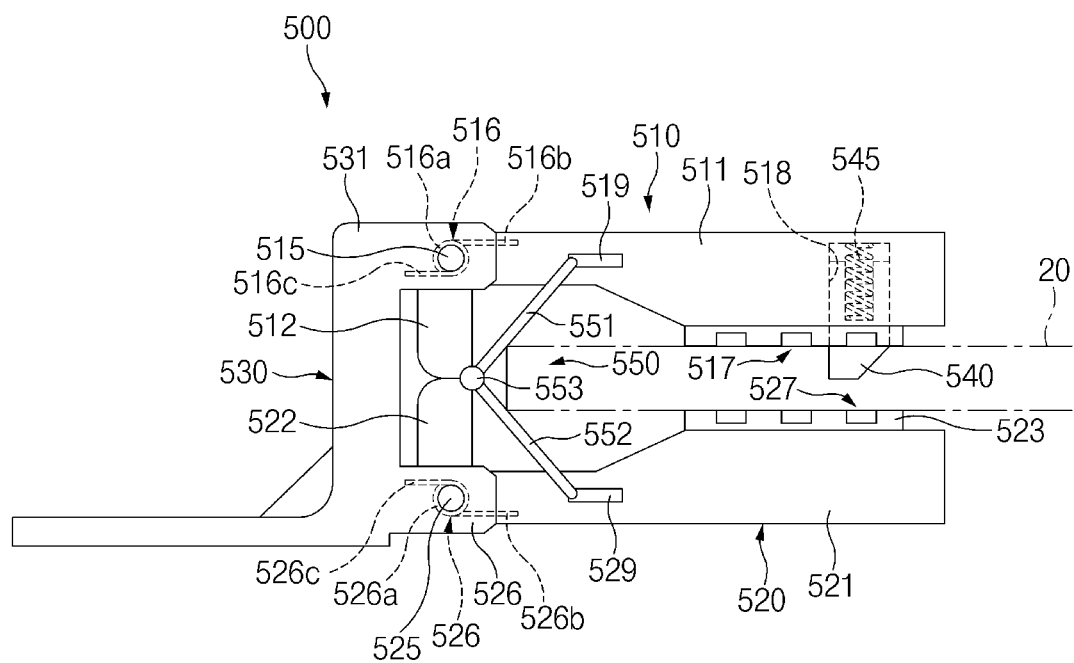
FIG. 14 illustrates another alternative example of a grip assembly in a hold lock mechanism for a vehicle door according to an exemplary embodiment of the present disclosure, in a state in which an upper grip portion of an upper grip member moves to a grip position, and a lower grip portion of a lower grip member moves to a grip position.

FIGS. 13 and 14 illustrate a grip assembly 500 according to another exemplary embodiment of the present disclosure. Referring to FIGS. 13 and 14, the grip assembly 500 may include an upper grip member 510, a lower grip member 520 facing the upper grip member 510, and a mounting bracket 530 to which the upper grip member 510 and the lower grip member 520 are mounted. The mounting bracket 530 may be fixed to the vehicle body 1.

Referring to FIGS. 13 and 14, the upper grip member 510 and the lower grip member 520 may be symmetrically disposed with respect to the door component 20. The upper grip member 510 and the lower grip member 520 may be pivotally mounted to the mounting bracket 530. The mounting bracket 530 may include an upper pivot lug 531 to which the upper grip member 510 is pivotally mounted through an upper hinge pin 515, and a lower pivot lug 532 to which the lower grip member 520 is pivotally mounted through a lower hinge pin 525. The upper pivot lug 531 may extend horizontally from a top end of the mounting bracket 530, and the lower pivot lug 532 may extend horizontally from a bottom end of the mounting bracket 530.

Referring to FIGS. 13 and 14, the upper grip member 510 may be pivotally mounted to the upper pivot lug 531 of the mounting bracket 530 through the upper hinge pin 515. The upper grip member 510 may include an upper grip portion 511 extending toward the door component 20, and an upper arm 512 extending downwardly from the upper grip portion 511.

The upper grip member 510 may move between a grip position and a release position.

The upper grip portion 511 may grip the top surface of the door component 20. The upper grip portion 511 may include an upper grip pad 513 attached to a bottom surface thereof, and the upper grip pad 513 may be made of a friction material such as rubber. The upper grip pad 513 may directly contact the top surface of the door component 20. The upper grip pad 513 may have a grip pattern 517 such as a tooth pattern, whereby a grip force of the upper grip portion 511 may be increased.

The upper arm 512 may extend orthogonally with respect to the upper grip portion 511.

The upper hinge pin 515 may be positioned between the upper grip portion 511 and the upper arm 512, and an upper biasing member 516 may be disposed around the upper hinge pin 515. The upper biasing member 516 may include a spring portion 516a disposed around the upper hinge pin 515, a first leg 516b fixed to the upper grip member 510, and a second leg 516c fixed to the mounting bracket 530.

The lower grip member 520 may be pivotally mounted to the lower pivot lug 532 of the mounting bracket 530 through the lower hinge pin 525. The lower grip member 520 may include a lower grip portion 521 extending toward the door component 20, and a lower arm 522 extending upwardly from the lower grip portion 521.

The lower grip member 520 may move between a grip position and a release position.

The lower grip portion 521 may grip the bottom surface of the door component 20. The lower grip portion 521 may include a lower grip pad 523 attached to a bottom surface thereof, and the lower grip pad 523 may be made of a friction material such as rubber. The lower grip pad 523 may directly contact the bottom surface of the door component 20. The lower grip pad 523 may have a grip pattern 527 such as a tooth pattern, whereby a grip force of the lower grip portion 521 may be increased.

The lower arm 522 may extend orthogonally with respect to the lower grip portion 521.

The lower hinge pin 525 may be positioned between the lower grip portion 521 and the lower arm 522, and a lower biasing member 526 may be disposed around the lower hinge pin 525. The lower biasing member 526 may include a spring portion 526a disposed around the lower hinge pin 525, a first leg 526b fixed to the lower grip member 520, and a second leg 526c fixed to the mounting bracket 530.

The grip assembly 500 may include a hook 540 mounted on at least one grip member of the upper grip member 510 and the lower grip member 520. The hook 540 may be movably mounted in a recess 518 of the upper grip portion 511. An axis of the hook 540 may be orthogonal to an axis of the upper grip member 510, and thus a movement direction of the hook 540 may be orthogonal to the axis of the upper grip member 510. The hook 540 may be movable between an advanced position and a retracted position.

The hook 540 may be biased toward the advanced position by a first biasing member 545. The first biasing member 545 may be a coil spring pushing the hook 540 within the recess 518. An axis of the first biasing member 545 may be parallel to the axis of the hook 540.

In addition, the grip assembly 500 may further include a touch link 550, and the touch link 550 may include an upper link 551 and a lower link 552 pivotally connected to the upper link 551 through a hinge 553. The upper grip member 510 may have an upper guide slot 519 formed in the upper grip portion 511, and the lower grip member 520 may have a lower guide slot 529 formed in the lower grip portion 521. The upper link 551 and the lower link 552 may be pivotal with each other. A top end of the upper link 551 may be guided along the upper guide slot 519, and a bottom end of the lower link 552 may be guided along the lower guide slot 529. As illustrated in FIG. 14, when the door component 20 pushes the hinge 553 of the touch link 550 toward the mounting bracket 530 of the grip assembly 500, the top end of the upper link 551 may be guided along the upper guide slot 519, and the bottom end of the lower link 552 may be guided along the lower guide slot 529. Thus, the upper grip member 510 and the lower grip member 520 may move to the grip position.

According to the above-described exemplary embodiments of the present disclosure, when the hold lock mechanism holds the vehicle door in a predetermined position of the vehicle, the grip members of the grip assembly 200, 400, or 500 may grip the top and bottom surfaces of the door component 20, and thus a contact area therebetween may be relatively increased compared to the related art and slight movements between the grip members and the door component may be prevented. Thus, when the vehicle door is held in the predetermined position, shaking or vibration of the vehicle door may be prevented.

The hold lock mechanism 30 for a vehicle door according to exemplary embodiments of the present disclosure may be a closed hold lock that keeps the vehicle sliding door in a closed state.

The hold lock mechanism 30 for a vehicle door according to exemplary embodiments of the present disclosure may be an open hold lock that keeps the vehicle sliding door in an open state.

The hold lock mechanism 30 for a vehicle door according to exemplary embodiments of the present disclosure may be applied to a transform-type vehicle door opening and closing apparatus which allows the vehicle door to open and close selectively in any one mode of a sliding mode and a swing mode. The sliding mode may allow the vehicle door to open and close by sliding in a longitudinal direction of the vehicle, and the swing mode may allow the vehicle door to open and close by swinging inwards and outwards.

FIGS. 15 to 30 illustrate a vehicle door opening and closing apparatus including the above-described hold lock mechanism 30.

Figure 15:
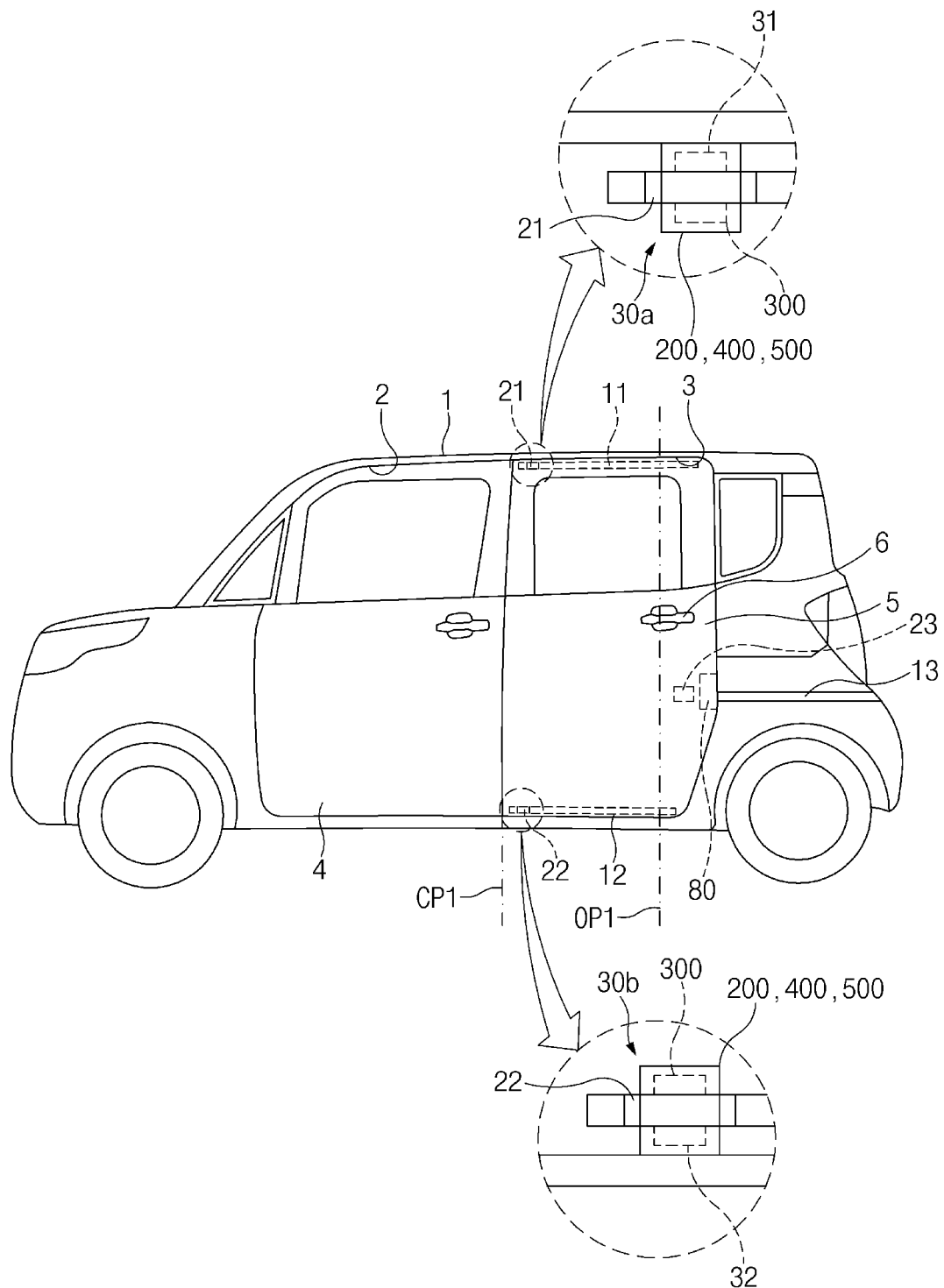
FIG. 15 illustrates a vehicle door opening and closing apparatus according to an exemplary embodiment of the present disclosure, which is mounted on a rear door of a vehicle.

Referring to FIG. 15, the vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

A vehicle door opening and closing apparatus according to exemplary embodiments of the present disclosure may be applied to the front door 4, the rear door 5, and the like. FIGS. 15 to 26 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus according to exemplary embodiments of the present disclosure may include one or more rails 11 and 12 mounted on the vehicle body 1, and the rails 11 and 12 may extend in the longitudinal direction of the vehicle. Referring to FIG. 15, the upper rail n may be mounted on an upper edge of the vehicle body 1, and the lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus according to exemplary embodiments of the present disclosure may include the roller units 21 and 22 guided along the rails 1 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold lock mechanisms 30a and 30b. Specifically, when the roller units 21 and 22 are held in the predetermined positions of the rails 11 and 12 by the hold lock mechanisms 30a and 30b, the vehicle door 5 may be opened and closed in the swing mode in which the vehicle door swings in the predetermined positions of the rails 11 and 12. When the roller units 21 and 22 are released by the hold lock mechanisms 30a and 30b, the vehicle door 5 may be opened and closed in the sliding mode in which the vehicle door slides along the rails 11 and 12.

Figure 17:
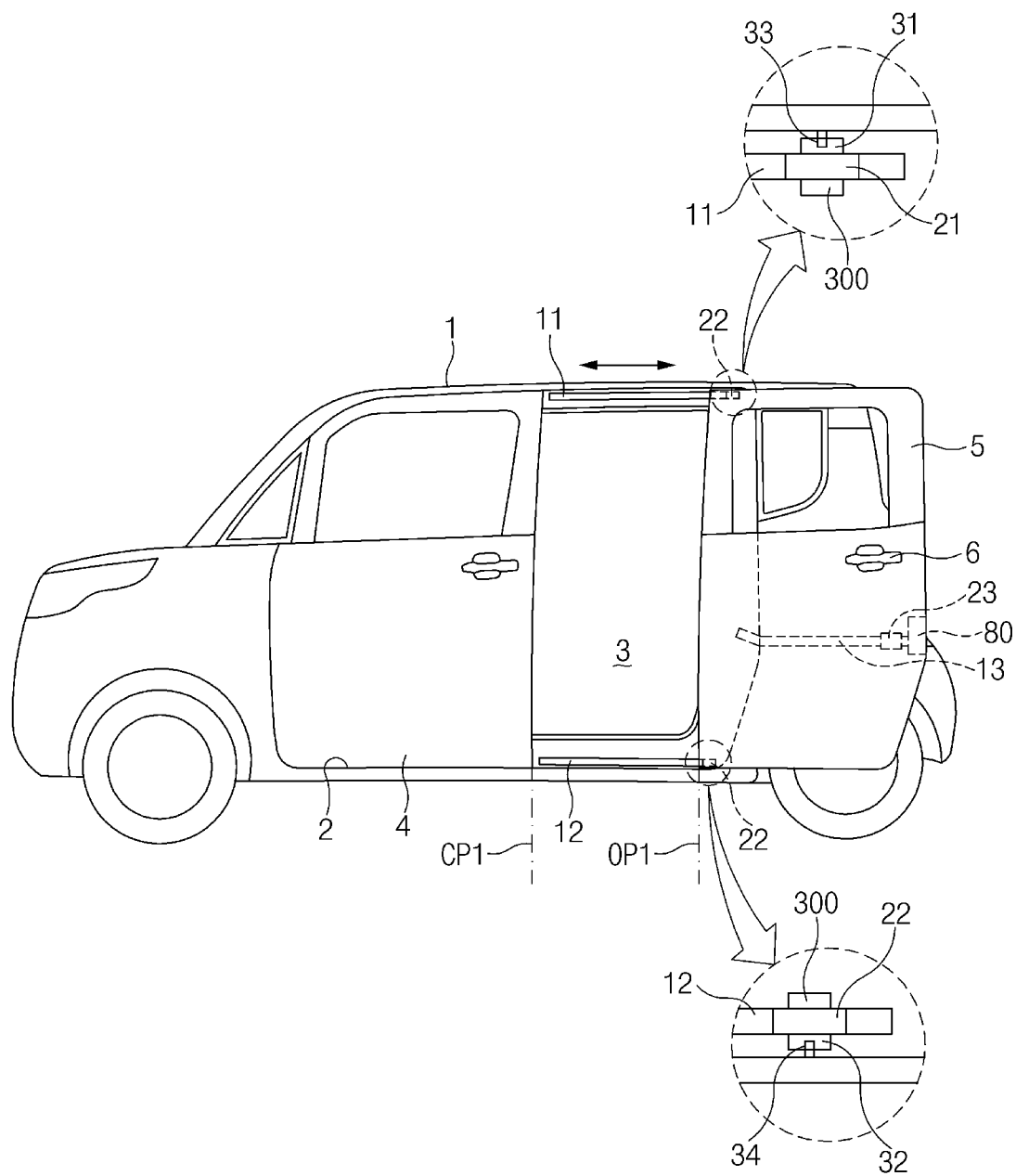
FIG. 17 illustrates a state in which the door of FIG. 15 is opened in a sliding mode.

Referring to FIGS. 15 and 17, the upper roller unit 21 may be mounted on an upper end of the vehicle door 5, and the upper roller unit 21 may slide along the upper rail 11. The lower roller unit 22 may be mounted on a lower end of the vehicle door 5, and the lower roller unit 22 may slide along the lower rail 12.

Figure 16:
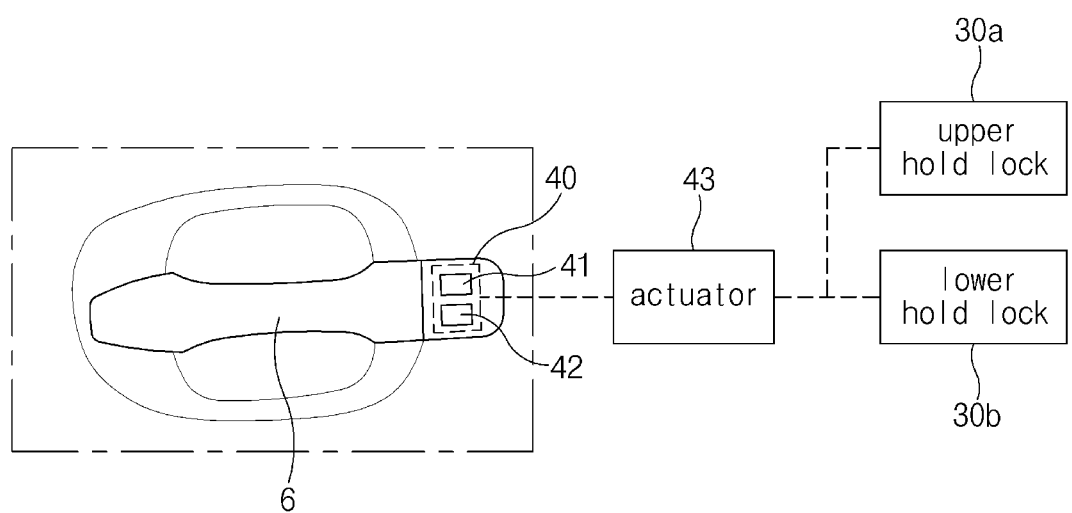
FIG. 16 illustrates a selector adjacent to an outside handle of a vehicle, an actuator connected to the selector, and hold locks.

Referring to FIG. 16, the vehicle door 5 may include an outside handle 6, and a selector 40 for selecting the sliding mode and the swing mode may be adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 17 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 15 and 17.

Figure 18:
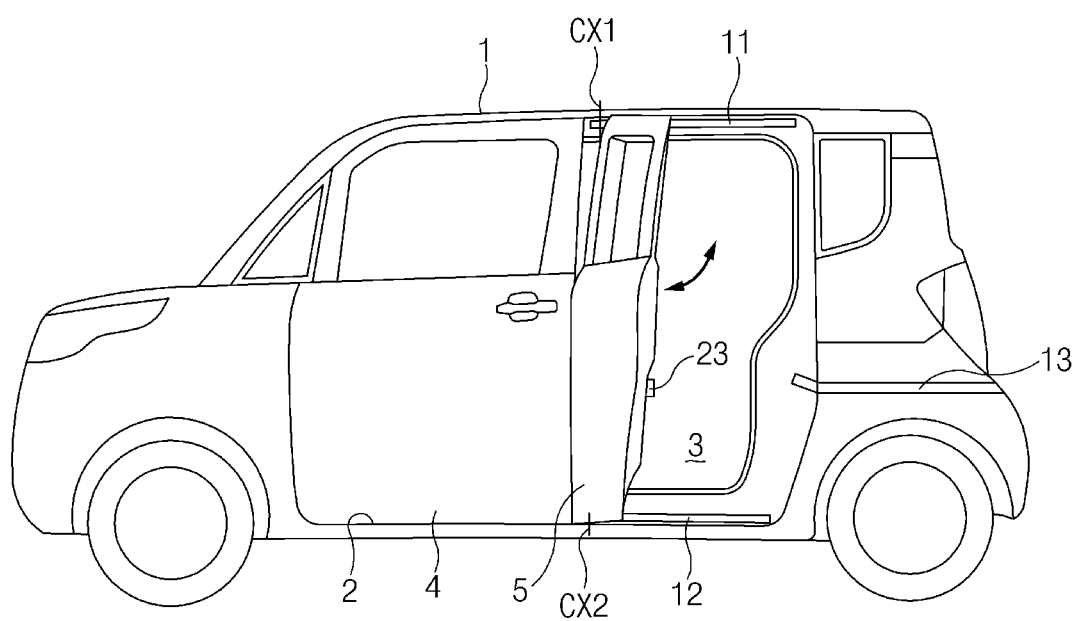
FIG. 18 illustrates a state in which the door of FIG. 15 is opened in a swing mode.
Figure 20:
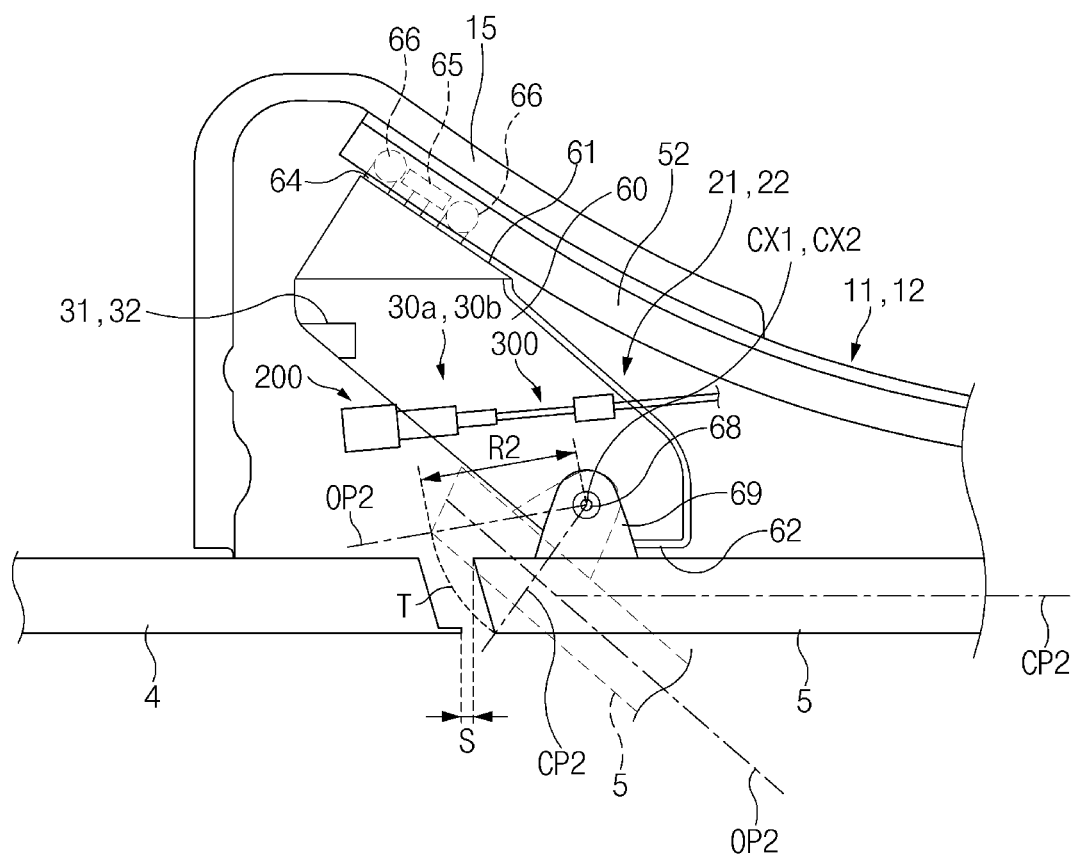
FIG. 20 illustrates an operation in which a vehicle door is opened and closed in a swing mode by an upper roller unit and a lower roller unit.

When the user presses the second switch 42 and the swing mode is selected, the vehicle door 5 may swing as illustrated in FIG. 18 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIG. 20. In particular, when the vehicle door 5 is held in the first closed position CP1, it may be operated in the swing mode.

Referring to FIG. 15, the vehicle door opening and closing apparatus may include an upper hold lock mechanism 30a disposed on an upper portion of the vehicle body 1 adjacent to the first closed position CP1 and the upper roller unit 21, and a lower hold lock mechanism 30b disposed on a lower portion of the vehicle body 1 adjacent to the first closed position CP1 and the lower roller unit 22.

The upper hold lock mechanism 30a and the lower hold lock mechanism 30b may have substantially the same configuration as that of the hold lock mechanism 30 illustrated in FIGS. 1 to 14.

The grip assembly 200, 400, or 500 of the upper hold lock mechanism 30a may be mounted on an upper edge of the vehicle body 1 adjacent to the first closed position CP1, and the release assembly 300 of the upper hold lock mechanism 30a may be mounted on the upper roller unit 21, so that the upper hold lock mechanism 30a may releasably hold the upper roller unit 21 in the first closed position CP1.

The grip assembly 200, 400, or 500 of the lower hold lock mechanism 30b may be mounted on a lower edge of the vehicle body 1 adjacent to the first closed position CP1, and the release assembly 300 of the lower hold lock mechanism 30b may be mounted on the lower roller unit 22, so that the lower hold lock mechanism 30b may releasably hold the lower roller unit 22 in the first closed position CP1.

The vehicle door 5 may be releasably held in the first closed position CP1 by the upper hold lock mechanism 30a and the lower hold lock mechanism 30b, and thus the vehicle door 5 may be kept in the closed state by the upper hold lock mechanism 30a and the lower hold lock mechanism 30b. That is, the upper hold lock mechanism 30a and the lower hold lock mechanism 30b may function as a closed hold lock that holds the vehicle door 5 in the first closed position CP1.

Referring to FIG. 17, an upper open hold lock 31 that holds the vehicle door 5 in the first open position OP1 may be mounted on the upper roller unit 21, and an upper striker 33 may be mounted on an upper edge of the vehicle body 1 adjacent to the first open position OP1. The upper open hold lock 31 may releasably hold the upper striker 33 in the first open position OP1. In addition, a lower open hold lock 32 that holds the vehicle door 5 in the first open position OP1 may be mounted on the lower roller unit 22, and a lower striker 34 may be mounted on a lower edge of the vehicle body 1 adjacent to the first open position OP1. The lower open hold lock 32 may releasably hold the lower striker 34 in the first open position OP1. Thus, the vehicle door 5 may be held in the first open position OP1 by the upper hold lock 31 and the lower hold lock 32.

Referring to FIGS. 18 and 20, the upper roller unit 21 may have an upper rotation axis CX1, and the vehicle door 5 may rotate around the upper rotation axis CX1. When the upper roller unit 21 is firmly held in the first closed position CP1 by the upper hold lock mechanism 30a, the vehicle door 5 may rotate around the upper rotation axis CX1. The lower roller unit 22 may have a lower rotation axis CX2, and the vehicle door 5 may rotate around the lower rotation axis CX2. When the lower roller unit 22 is firmly held in the first closed position CP1 by the lower hold lock mechanism 30b, the vehicle door 5 may rotate around the lower rotation axis CX2.

As illustrated in FIG. 18, the upper rotation axis CX1 and the lower rotation axis CX2 may be vertically aligned, and the vehicle door 5 may rotate around the vertically aligned upper and lower rotation axes CX1 and CX2.

Referring to FIG. 16, the selector 40 may be electrically connected to the actuator 43, and the actuator 43 may be configured to operate the upper open hold lock 31 and the lower open hold lock 32.

As the user selects the selector 40, the actuator 43 may be connected to the release assembly 300 of the upper hold lock mechanism 30a and the release assembly 300 of the lower hold lock mechanism 30b. The actuator 43 may selectively perform a hold operation in which the upper hold lock mechanism 30a and the lower hold lock mechanism 30b hold the upper roller unit 21 and the lower roller unit 22, and a release operation in which the upper hold lock mechanism 30a and the lower hold lock mechanism 30b release the upper roller unit 21 and the lower roller unit 22.

When the user presses the first switch 41 of the selector 40 in a state in which the vehicle door 5 is closed, the upper hold lock mechanism 30a may release the upper roller unit 21 and the lower hold lock mechanism 30b may release the lower roller unit 22 simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock mechanism 30a may hold the upper roller unit 21 and the lower hold lock mechanism 30b may hold the lower roller unit 22 simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 16, one actuator 43 may operate the upper hold lock mechanism 30a and the lower hold lock mechanism 30b simultaneously.

According to another exemplary embodiment, an actuator operating the upper hold lock mechanism 30a and another actuator operating the lower hold lock mechanism 30b may be individually connected to the selector 40.

Figure 19:
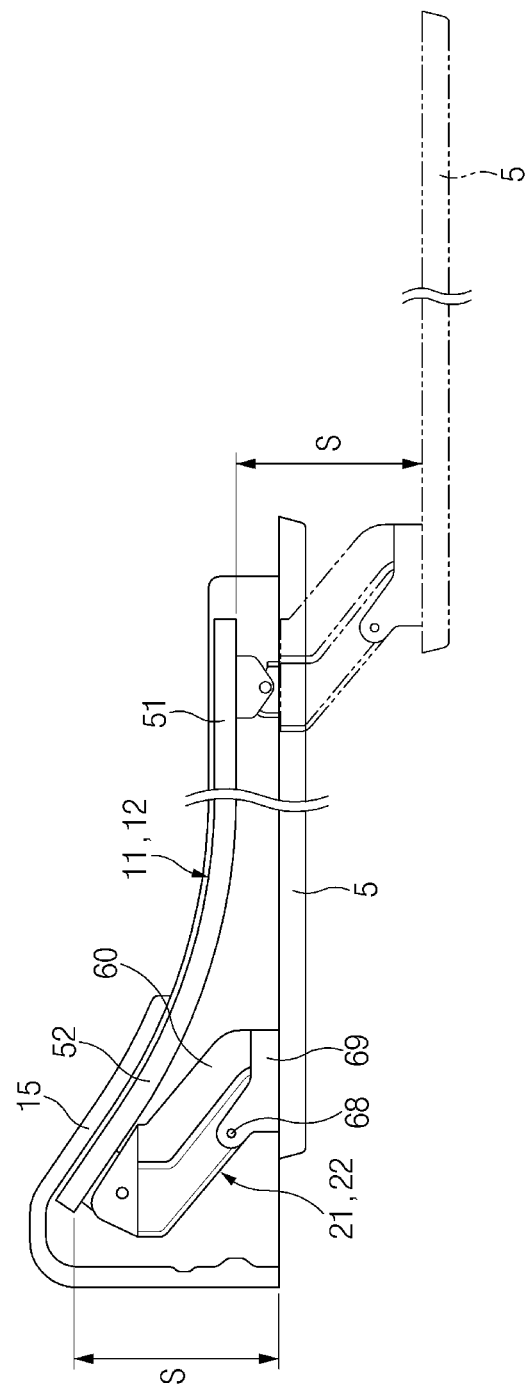
FIG. 19 illustrates a sliding mode of a vehicle door opening and closing apparatus according to an exemplary embodiment of the present disclosure, in which an upper roller unit and a lower roller unit move along an upper rail and a lower rail.

Referring to FIG. 19, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Referring to FIG. 20, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 20, a middle roller 65 and two side rollers 66 disposed on both sides of the middle roller 65 may be rotatably mounted on the roller bracket 64. A rotation axis of the middle roller 65 may be orthogonal to a rotation axis of the side roller 66.

The body 60 may extend diagonally so as not to contact the first extension portion 51 and the second extension portion 52. The body 60 may have a first end portion 61 facing the interior side of the vehicle, and a second end portion 62 facing the exterior side of the vehicle.

The first end portion 61 of the body 60 may be fixed to the roller bracket 64, and the second end portion 62 of the body 60 may be pivotally connected to the vehicle door 5 through a pivot pin 68. Thus, the vehicle door 5 may swing around the pivot pin 68 adjacent to the second end portion 62 of the body 60.

The roller bracket 64 may be directly fixed to the first end portion 61 of the body 60 by welding, using fasteners, and/or the like, and the second end portion 62 of the body 60 may be pivotally connected to the vehicle door 5 through the pivot pin 68. The vehicle door 5 may have a pivot lug 69 protruding toward the body 60, and the pivot lug 69 may be pivotally connected to the second end portion 62 of the body 60 through the pivot pin 68. The second end portion 62 of the body 60 may be shaped so as not to interfere with the vehicle door 5 when the vehicle door 5 swings. The upper rotation axis CX1 and the lower rotation axis CX2 may be defined by the pivot pin 68. For example, the upper rotation axis CX1 and the lower rotation axis CX2 may be a virtual axis extending vertically along a center point of the pivot pin 68, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2.

Referring to FIG. 20, the release assembly 300 of the upper hold lock mechanism 30a may be mounted on the body 60 of the upper roller unit 21, and the grip assembly 200 of the upper hold lock mechanism 30a may be mounted on the vehicle body adjacent to the upper rotation axis CX1. The release assembly 300 of the lower hold lock mechanism 30b may be mounted on the body 60 of the lower roller unit 22, and the grip assembly 200 of the lower hold lock mechanism 30b may be mounted on the vehicle body adjacent to the lower rotation axis CX2.

When the upper hold lock mechanism 30a firmly holds the roller bracket 64 of the upper roller unit 21 in the first closed position CP1 and the lower hold lock mechanism 30b firmly holds the roller bracket 64 of the lower roller unit 22 in the first closed position CP1 by the hold operation of the actuator 43, the vehicle door 5 may swing around the upper rotation axis CX1 of the upper roller unit 21 and the lower rotation axis CX2 of the lower roller unit 22 as illustrated in FIG. 20. Thus, the vehicle door 5 may move between the second closed position CP2 in which the vehicle door 5 is closed and the second open position OP2 in which the vehicle door 5 is opened. When the vehicle door 5 swings, another adjacent door 4 or other components may be spaced apart from the vehicle door 5 by a predetermined gap so as not to interfere with the door 4 or the other components. For example, the vehicle door 5 may be a rear door, and another adjacent door 4 may be a front door.

According to the exemplary embodiment illustrated in FIG. 20, as the pivot pin 68 is positioned between the second end portion 62 of the body 60 and the vehicle door 5, the rotation axes CX1 and CX2 of the vehicle door 5 may be relatively close to the vehicle door 5. A rotation radius R2 of the vehicle door 5 may be relatively shortened, so that a gap S between the vehicle door 5 and another adjacent door 4 may be relatively reduced, resulting in improved exterior styling. Even though the rotation axes CX1 and CX2 of the vehicle door 5 are close to the vehicle door 5, a swing trajectory T of the vehicle door 5 may not be reduced, and thus an open space created by the swing of the vehicle door 5 may not be narrowed.

Figure 21:
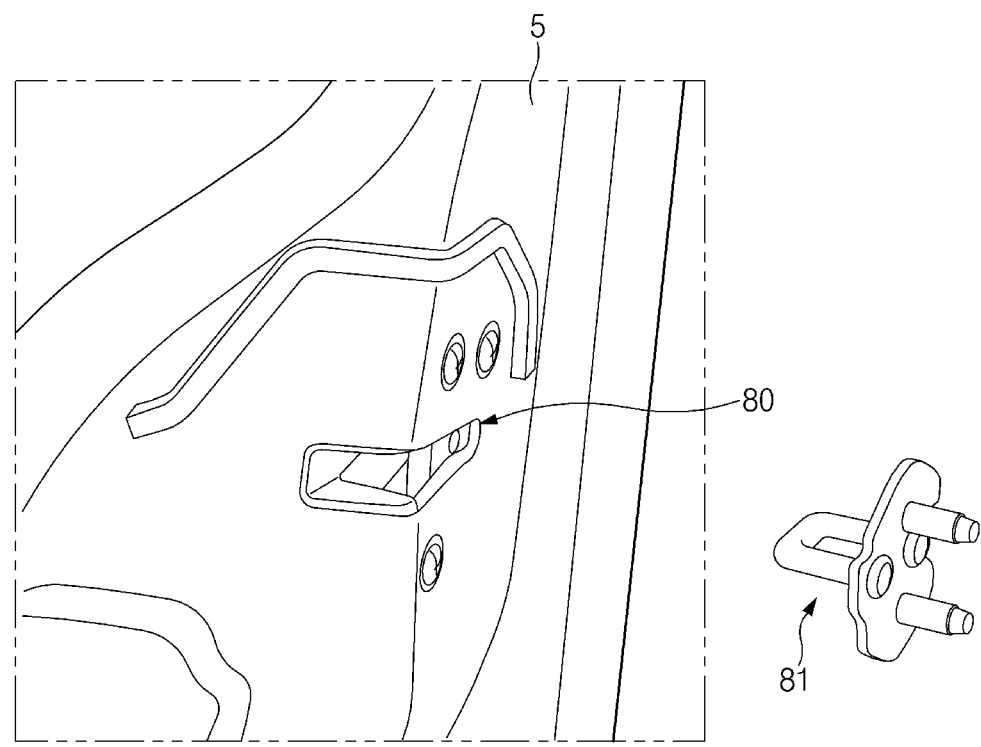
FIG. 21 illustrates a main latch mounted on a vehicle door and a main striker.

Referring to FIG. 21, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by the engaging operation of the outside handle 6 so that the vehicle door 5 may be held in the first closed position CP1 or the second closed position CP2. When the vehicle door 5 is in the first closed position CP1 or the second closed position CP2, the main latch 80 may release the main striker 81 by the release operation of the outside handle 6 so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus according to exemplary embodiments of the present disclosure may further include the center rail 13 mounted at a central portion of the vehicle body 1, and the center roller unit 23 guided along the center rail 13.

Referring to FIGS. 15 and 17, the center rail 13 may extend from a rear edge of the door aperture 3 in the longitudinal direction of the vehicle and be disposed on the rear of the vehicle body 1. The center roller unit 23 may be mounted at a central portion of the vehicle door 5. In particular, the center roller unit 23 may be mounted in a position adjacent to the rear end of the vehicle door 5. The center roller unit 23 may be guided along the center rail 13.

Figure 22:
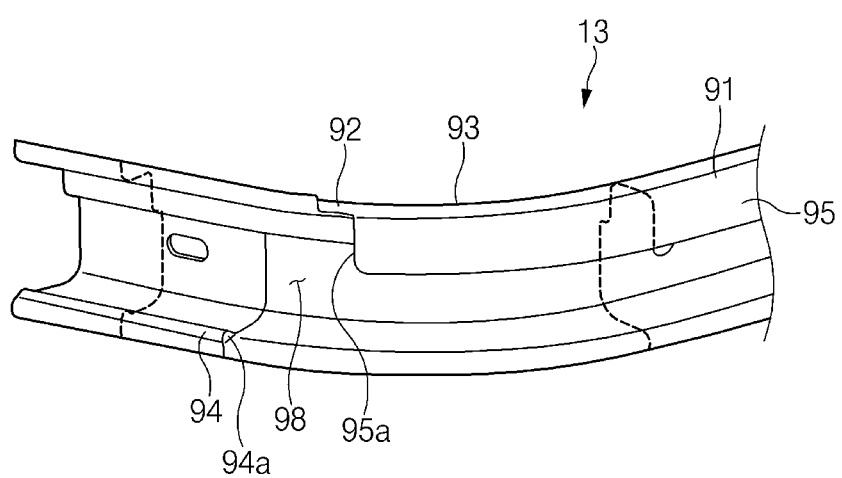
FIG. 22 illustrates a perspective view of a center rail in a vehicle door opening and closing apparatus according to an exemplary embodiment of the present disclosure.

Referring to FIG. 22, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 23:
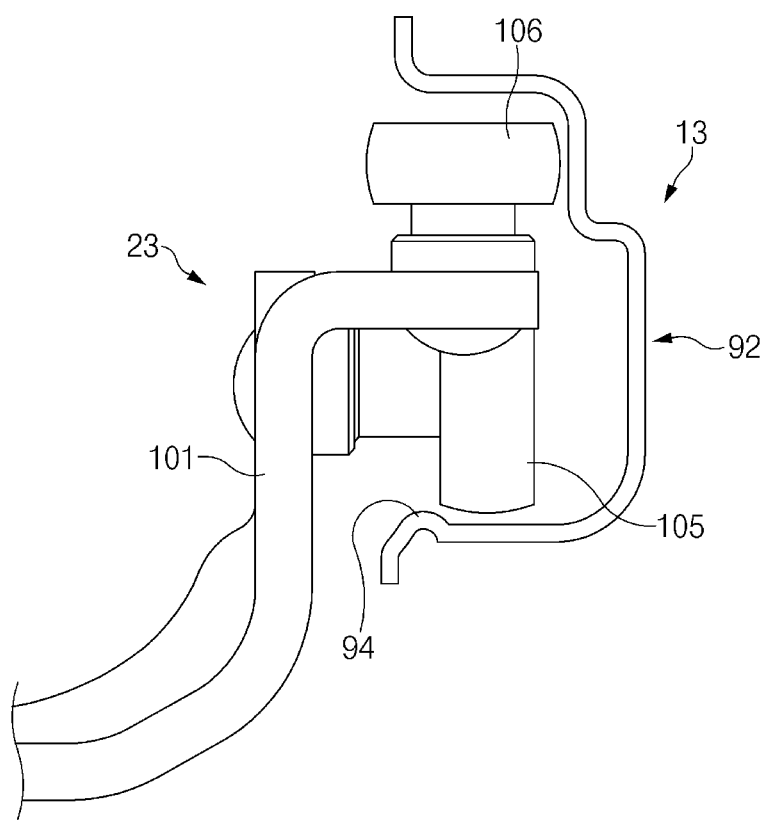
FIG. 23 illustrates a cross-sectional view of a swing guide of a center rail.
Figure 24:
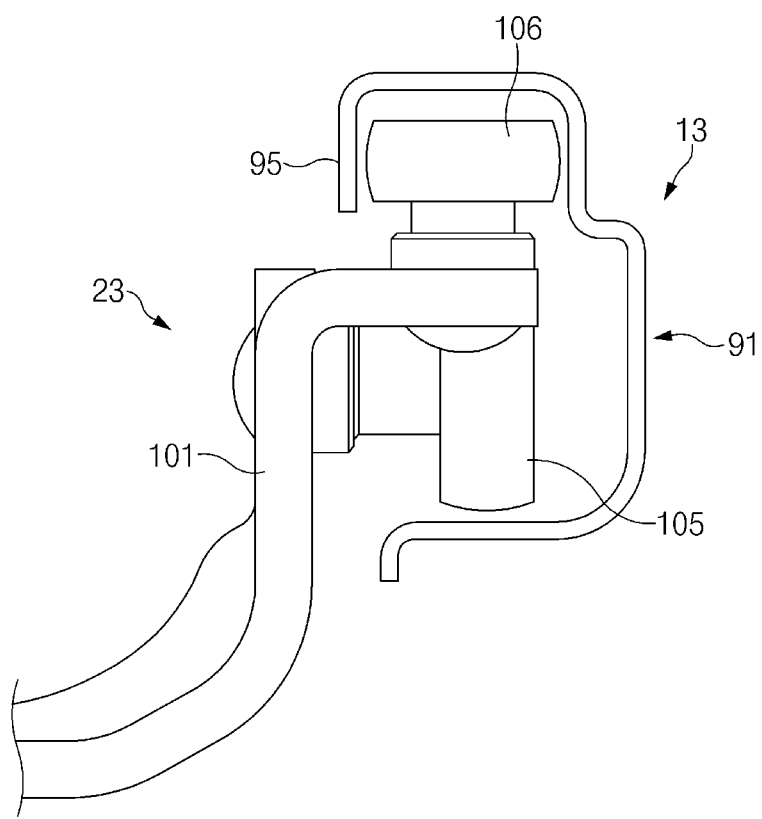
FIG. 24 illustrates a cross-sectional view of a sliding guide of a center rail.
Figure 25:
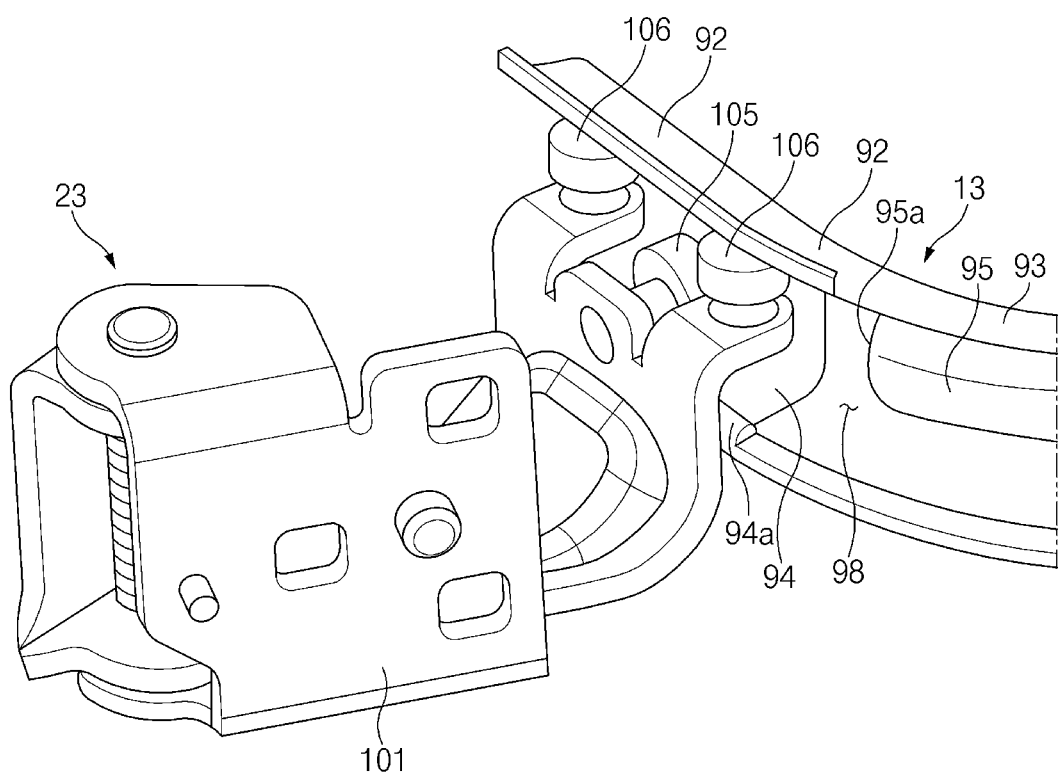
FIG. 25 illustrates a structure in which a center roller unit is held in a swing guide of a center rail.

Referring to FIGS. 23 to 25, the center roller unit 23 may include a roller bracket 101 and rollers 105 and 106 rotatably mounted on the roller bracket 101. The roller bracket 101 may be fixed to the central portion of the vehicle door 5. The rollers 105 and 106 may roll along the center rail 13. As illustrated in FIG. 25, a middle roller 105 and two side rollers 106 disposed on both sides of the middle roller 105 may be rotatably mounted on the roller bracket 101. A rotation axis of the middle roller 105 may be orthogonal to a rotation axis of the side roller 106.

When the vehicle door 5 slides in the longitudinal direction of the vehicle as the sliding mode is selected, the sliding guide 91 may guide the center roller unit 23.

Referring to FIGS. 22 and 24, the sliding guide 91 may include a stopper wall 95 preventing the center roller unit 23 from being released from the sliding guide 91. The stopper wall 95 may extend along a length of the sliding guide 91 and a length of the bending portion 93. The stopper wall 95 may protrude vertically downward from the top of the sliding guide 91. As the stopper wall 95 closes an upper area of the sliding guide 91 and an upper area of the bending portion 93, the center roller unit 23 may be prevented from moving away from the sliding guide 91 toward the exterior side of the vehicle as illustrated in FIG. 24.

When the vehicle door 5 is opened and closed in the swing mode as the swing mode is selected, the swing guide 92 may guide the center roller unit 23 to be released from the center rail 13.

An exterior side of the swing guide 92 may be entirely opened toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1 or T2, the middle roller 105 of the center roller unit 23 may be guided along the guide projection 94 as illustrated in FIG. 23.

Figure 26:
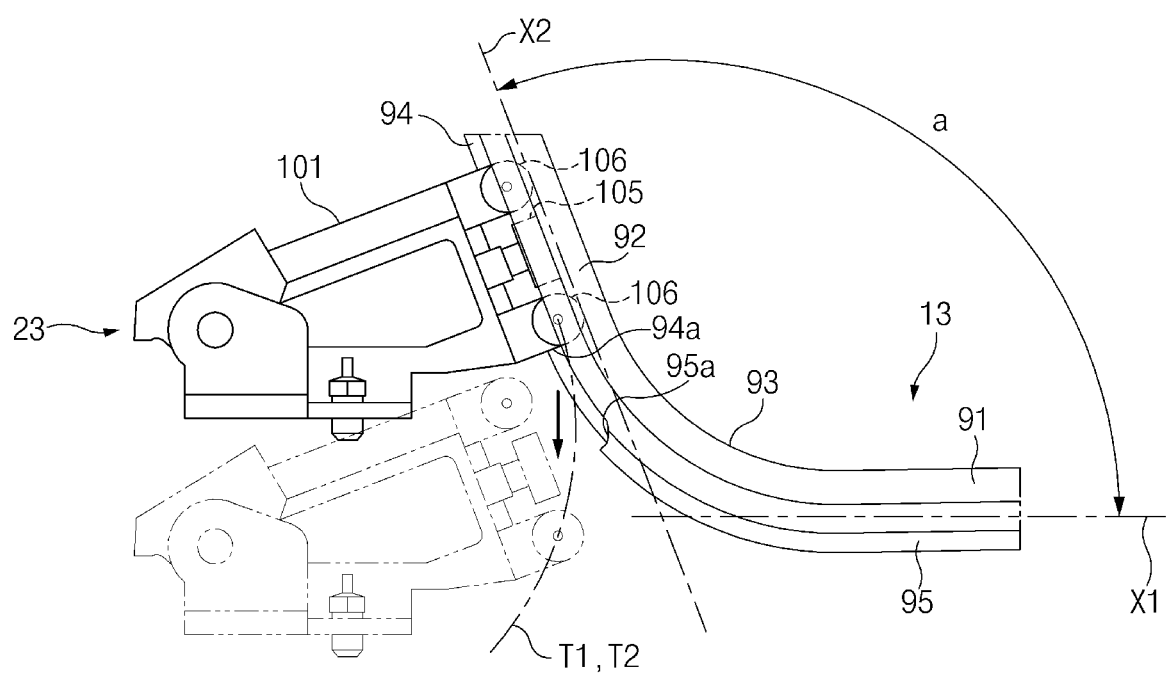
FIG. 26 illustrates an operation in which a center roller unit is released from a swing guide of a center rail.

A front end 95a of the stopper wall 95 of the sliding guide 91 and a rear end 94a of the guide projection 94 may be positioned so as not to interfere with the swing trajectory of the vehicle door 5. In addition, as illustrated in FIG. 26, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the center roller unit 23 may easily be released from the swing guide 92 of the center rail 13 or may easily be held in the swing guide 92 of the center rail 13. The center rail 13 may include a space 98 allowing the center roller unit 23 to be released from the center rail 13 or be held in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Thus, there is no interference when the center roller unit 23 is released from the center rail 13 or is held in the center rail 13 in the swing mode.

FIGS. 15 to 26 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 27:
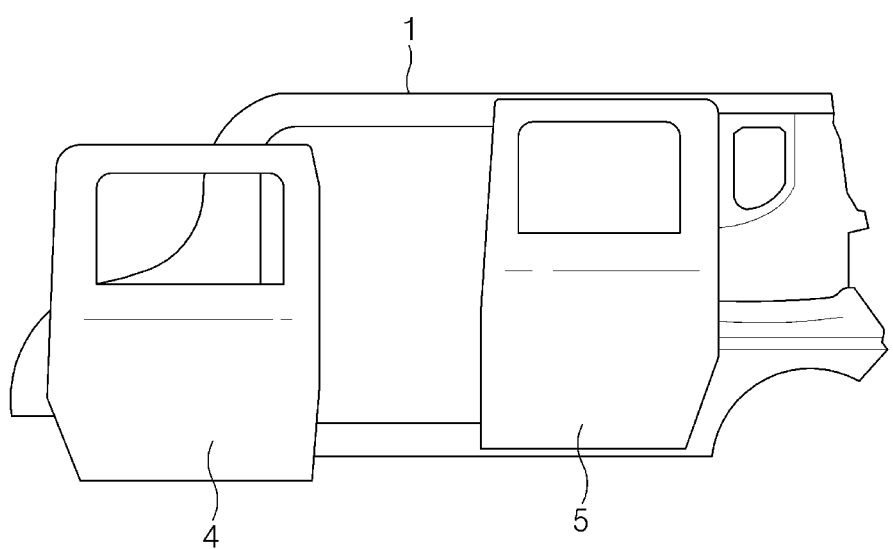
FIG. 27 illustrates a vehicle door opening and closing apparatus according to an exemplary embodiment of the present disclosure, which is applied to a front door of a vehicle, in a state in which the front door is opened in a sliding mode.
Figure 28:
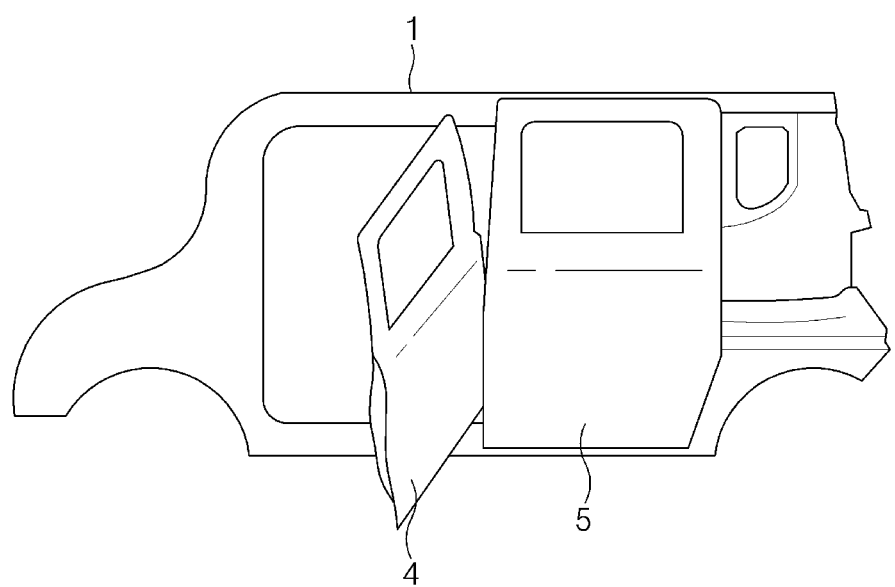
FIG. 28 illustrates a state in which the front door of FIG. 27 is opened in a swing mode.

FIGS. 27 and 28 illustrate the vehicle door opening and closing apparatus according to exemplary embodiments of the present disclosure applied to the front door 4. FIG. 27 illustrates a state in which the front door 4 is opened in the sliding mode, and FIG. 28 illustrates a state in which the front door 4 is opened in the swing mode.

Figure 29:
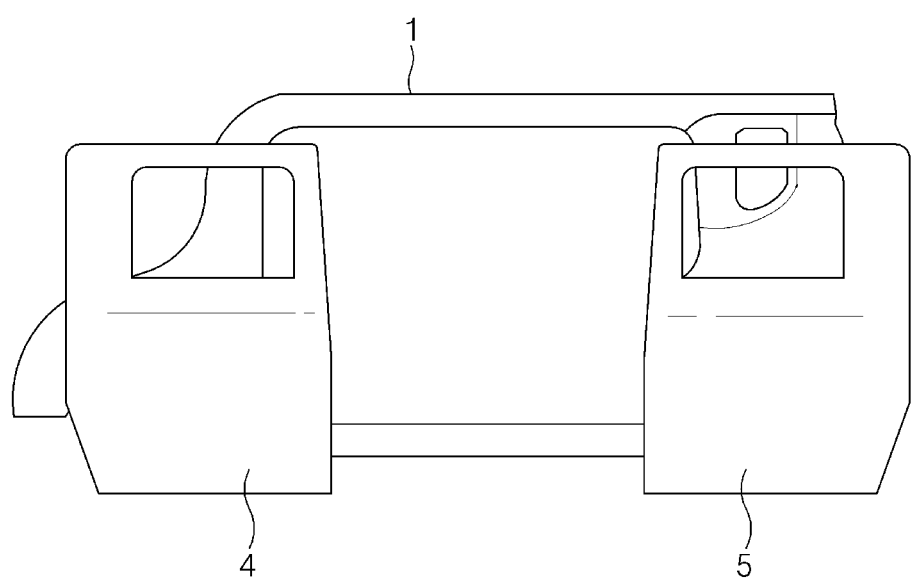
FIG. 29 illustrates a vehicle door opening and closing apparatus according to an exemplary embodiment of the present disclosure, which is applied to a front door and a rear door of a vehicle, in a state in which the front door and the rear door are opened in a sliding mode.
Figure 30:
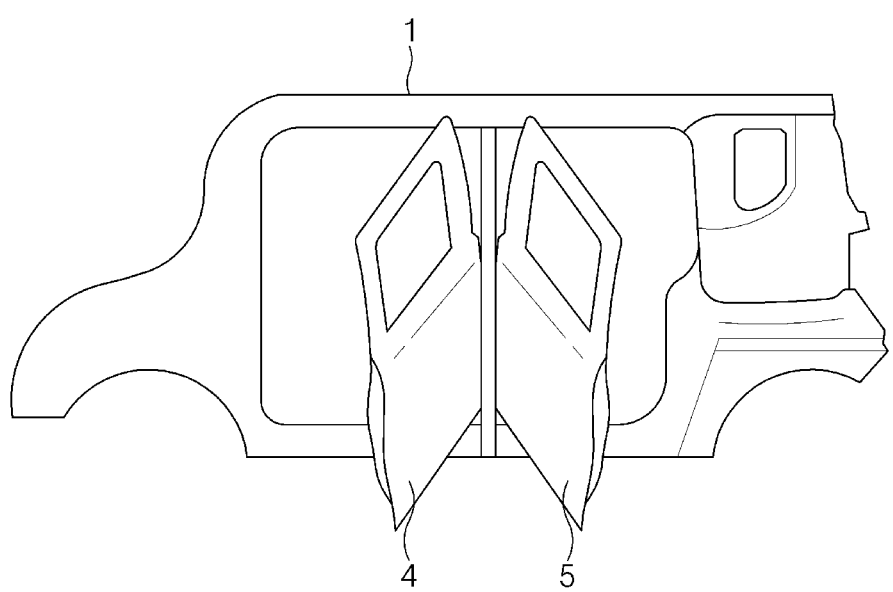
FIG. 30 illustrates a state in which the front door and the rear door of FIG. 29 are opened in a swing mode.

FIGS. 29 and 30 illustrate the vehicle door opening and closing apparatus according to exemplary embodiments of the present disclosure applied to both the front door 4 and the rear door 5. FIG. 29 illustrates a state in which the front door 4 and the rear door 5 are opened in the sliding mode, and FIG. 30 illustrates a state in which the front door 4 and the rear door 5 are opened in the swing mode.

As set forth above, according to exemplary embodiments of the present disclosure, when the hold lock mechanism holds the vehicle door in a predetermined position of the vehicle, the grip members of the grip assembly may grip the top and bottom surfaces of the door component, and thus a contact area therebetween may be relatively increased compared to the related art and slight movements between the grip members and the door component may be prevented. Thus, when the vehicle door is held in the predetermined position, the shaking or vibration of the vehicle door may be prevented.

The vehicle door opening and closing apparatus according to exemplary embodiments of the present disclosure may perform the opening and closing operations of the vehicle door by selectively switching the sliding mode and the swing mode, thereby meeting the needs of customers such as convenience and diversity. In addition, it may select the opening and closing operations of the vehicle door by taking the customer's situation and environment into consideration, thereby improving convenience and quality.

In terms of vehicle specifications, the vehicle door opening and closing structure may be standardized for various vehicles, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hold lock mechanism for a vehicle door, the hold lock mechanism comprising:
   a grip assembly configured to be mounted on a vehicle body, the grip assembly including a pair of grip members configured to releasably grip a door component and a hook provided on at least one of the grip members; and
   a release assembly mounted on the door component, the release assembly including a release member configured to releasably engage with the hook;
   wherein the door component has a cavity;
   wherein the release member is movably received in the cavity; and
   wherein the hook is configured to move between an advanced position in which the hook is received in the cavity of the door component and a retracted position in which the hook is released from the door component.

2. The hold lock mechanism according to claim 1, wherein at least one grip member of the pair of grip members is configured to move between a grip position in which the grip member grips the door component and a release position in which the grip member releases the door component.

3. The hold lock mechanism according to claim 1, wherein the hook is biased toward the advanced position by a first biasing member.

4. The hold lock mechanism according to claim 3, wherein:
   the release member is configured to move between an engaging position in which the release member engages with the hook moved to the advanced position and a release position in which the release member moves the hook to the retracted position; and
   the release member is biased toward the engaging position by a second biasing member.

5. The hold lock mechanism according to claim 4, wherein a movement direction of the release member is orthogonal to a movement direction of the hook.

6. The hold lock mechanism according to claim 4, wherein an axis of the second biasing member is orthogonal to an axis of the first biasing member.

7. The hold lock mechanism according to claim 4, wherein the release member is configured to be moved to the release position by a release lever.

8. The hold lock mechanism according to claim 7, wherein:
   the release lever is pivotally mounted to the door component; and
   the release lever is configured to be pivoted by a control cable assembly.

9. The hold lock mechanism according to claim 8, wherein the release lever is configured to move between a lock position in which the release lever holds the release member in the engaging position and an unlock position in which the release lever moves the release member to the release position.

10. A vehicle comprising:
    a vehicle body;
    a vehicle door attached to the vehicle body;
    a rail mounted on the vehicle body;
    a roller unit mounted on the vehicle door and configured to move along the rail; and
    a hold lock mechanism configured to releasably hold the roller unit in a predetermined position of the vehicle, wherein the hold lock mechanism includes:
      a grip assembly mounted on the vehicle body, the grip assembly including a pair of grip members configured to releasably grip the roller unit and a hook movably mounted on at least one of the grip members; and
      a release assembly mounted on the roller unit, the release assembly including a release member configured to releasably engage with the hook.

11. The vehicle according to claim 10, wherein the roller unit is configured to allow the vehicle door to open and close in a sliding mode in which the vehicle door slides along the rail and a swing mode in which the vehicle door swings at a predetermined position of the rail.

12. The vehicle according to claim 10, wherein:
    the vehicle door is configured to swing when the roller unit is held in a predetermined position of the rail by the hold lock mechanism; and
    the vehicle door is configured to slide along the rail when the roller unit is released by the hold lock mechanism.

13. The vehicle according to claim 10, wherein:
    the roller unit includes a roller bracket having a roller configured to roll along the rail, and a body connecting the roller bracket and the vehicle door; and
    the body has a first end portion fixed to the roller bracket, and a second end portion pivotally connected to the vehicle door.

14. The vehicle according to claim 13, wherein the release assembly is mounted on the body.

15. A hold lock mechanism for a vehicle door, the hold lock mechanism comprising:
    a grip assembly configured to be mounted on a vehicle body, the grip assembly including a pair of grip members configured to releasably grip a door component and a hook provided on at least one of the grip members; and
    a release assembly mounted on the door component, the release assembly including a release member configured to releasably engage with the hook;
    wherein the door component has a cavity;
    wherein the release member is movably received in the cavity;
    wherein the hook is configured to move between an advanced position in which the hook is received in the cavity of the door component and a retracted position in which the hook is released from the door component
    wherein the hook is biased toward the advanced position by a first biasing member;
    wherein the hook has a first engaging surface extending vertically and a second engaging surface extending obliquely;
    wherein the cavity has a third engaging surface slidably contacting the first engaging surface;
    wherein the release member has a fourth engaging surface facing the third engaging surface; and
    wherein the fourth engaging surface slidably contacts the second engaging surface.

16. The hold lock mechanism according to claim 15, wherein at least one grip member of the pair of grip members is configured to move between a grip position in which the grip member grips the door component and a release position in which the grip member releases the door component.

17. The hold lock mechanism according to claim 15, wherein:
    the release member is configured to move between an engaging position in which the release member engages with the hook moved to the advanced position and a release position in which the release member moves the hook to the retracted position; and the release member is biased toward the engaging position by a second biasing member.

18. The hold lock mechanism according to claim 17, wherein a movement direction of the release member is orthogonal to a movement direction of the hook.

19. The hold lock mechanism according to claim 17, wherein an axis of the second biasing member is orthogonal to an axis of the first biasing member.

* * * * *